US012444364B2

(12) United States Patent
Zhang et al.

(10) Patent No.: US 12,444,364 B2
(45) Date of Patent: Oct. 14, 2025

(54) INITIAL SIGNAL GENERATOR, DISPLAY PANEL AND DISPLAY METHOD THEREOF, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Jiaxiang Zhang, Beijing (CN); Liangliang Ju, Beijing (CN); Zan Luo, Beijing (CN); Yonglin Chen, Beijing (CN); Gong Chen, Beijing (CN); Yuan Fang, Beijing (CN); Mingqiang Wang, Beijing (CN); Chang Wang, Beijing (CN); Seungyong Oh, Beijing (CN); Bin Zhang, Beijing (CN); Xin Mu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/689,080

(22) PCT Filed: Aug. 31, 2022

(86) PCT No.: PCT/CN2022/116290

§ 371 (c)(1),
(2) Date: Mar. 5, 2024

(87) PCT Pub. No.: WO2024/045067

PCT Pub. Date: Mar. 7, 2024

(65) Prior Publication Data

US 2025/0131880 A1 Apr. 24, 2025

(51) Int. Cl.
*G09G 3/3233* (2016.01)
*G09G 3/20* (2006.01)

(52) U.S. Cl.
CPC ......... *G09G 3/3233* (2013.01); *G09G 3/2074* (2013.01); *G09G 2300/0819* (2013.01);
(Continued)

(58) Field of Classification Search
CPC ............... G09G 3/3233; G09G 3/2074; G09G 2300/0819; G09G 2300/0842;
(Continued)

(56) References Cited

U.S. PATENT DOCUMENTS 11,557,257 B2 * 1/2023 Hwang ................ G09G 3/3291
11,568,823 B2 * 1/2023 Shen .................... G09G 3/3291
(Continued)

FOREIGN PATENT DOCUMENTS

CN 1864189 B 10/2010
CN 111968574 A 11/2020
(Continued)

OTHER PUBLICATIONS

International Search Report for PCT/CN2022/116290 Mailed May 18, 2023.

*Primary Examiner* — Stephen G Sherman

(74) *Attorney, Agent, or Firm* — Ling Wu; Stephen Yang; Ling and Yang Intellectual Property

(57) ABSTRACT

The display panel includes multiple pixel units arranged in an array, a pixel unit including multiple sub-pixels, a sub-pixel including a pixel drive circuit and a light emitting element connected with the pixel drive circuit, the display panel further including an initial signal generator, the display panel including a low frequency driving mode and a normal driving mode, the low frequency driving mode including a refresh frame stage for writing data to the pixel
(Continued)

unit and a hold frame stage for holding the data written to the pixel unit, the initial signal generator being configured to acquire a current display brightness value band and a pattern to be displayed in the low frequency driving mode; quantize the pattern to be displayed to get an average picture level; determine a corresponding anode reset voltage according to the current display brightness value band and the average picture level.

18 Claims, 11 Drawing Sheets

(52) U.S. Cl.
CPC ............... *G09G 2300/0842* (2013.01); *G09G 2300/0861* (2013.01); *G09G 2310/08* (2013.01); *G09G 2320/0233* (2013.01); *G09G 2320/0247* (2013.01); *G09G 2340/0435* (2013.01); *G09G 2360/16* (2013.01)

(58) Field of Classification Search
CPC ....... G09G 2300/0861; G09G 2310/08; G09G 2320/0233; G09G 2320/0247; G09G 2340/0435; G09G 2360/16
See application file for complete search history.

(56) References Cited

U.S. PATENT DOCUMENTS

| | | | | |
|---|---|---|---|---|
| 2021/0043143 | A1 * | 2/2021 | Kim ..................... | G09G 3/3291 |
| 2022/0051630 | A1 | 2/2022 | Shen et al. | |
| 2022/0335896 | A1 * | 10/2022 | Kuang ................. | G09G 3/3291 |
| 2022/0335898 | A1 | 10/2022 | Hwang et al. | |

FOREIGN PATENT DOCUMENTS

| | | | |
|---|---|---|---|
| CN | 112349246 | A | 2/2021 |
| CN | 113450711 | A | 9/2021 |
| CN | 113870789 | A | 12/2021 |
| CN | 113889035 | A | 1/2022 |
| KR | 20190081723 | A | 7/2019 |

* cited by examiner

INITIAL SIGNAL GENERATOR, DISPLAY PANEL AND DISPLAY METHOD THEREOF, AND DISPLAY APPARATUS

CROSS-REFERENCE TO RELATED APPLICATIONS

The present application is a U.S. National Phase Entry of International Application PCT/CN2022/116290 having an international filing date of Aug. 31, 2022, and the contents disclosed in the above-mentioned application are hereby incorporated as a part of this application.

TECHNICAL FIELD

Embodiments of the present disclosure relate to, but are not limited to, the field of display technologies, and particularly to an initial signal generator, a display panel and a display method thereof, and a display apparatus.

BACKGROUND

An Organic Light Emitting Diode (OLED) is an active light emitting display device, which has advantages such as luminescence, ultra-thinness, a wide angle of view, a high brightness, a high contrast, a relatively low power consumption, an extreme high response speed, or the like. Depending upon different driving modes, OLEDs may be divided into two types, i.e., a Passive Matrix (PM) type and an Active Matrix (AM) type. An AMOLED is a current driven device in which an independent Thin Film Transistor (TFT) is used for controlling each sub-pixel, and each sub-pixel may be continuously and independently driven to emit light.

SUMMARY

The following is a summary of subject matter described herein in detail. The summary is not intended to limit the protection scope of claims.

An embodiment of the present disclosure provides a display panel, including multiple pixel units arranged in an array, at least one pixel unit including multiple sub-pixels, at least one sub-pixel including a pixel drive circuit and a light emitting element electrically connected with the pixel drive circuit, the display panel further including an initial signal generator, a driving mode of the display panel including a low frequency driving mode and a normal driving mode, and the low frequency driving mode including a refresh frame stage configured to write data to the pixel unit and a hold frame stage configured to hold the data written to the pixel unit, wherein: the initial signal generator is configured to acquire a current display brightness value (DBV) band and a pattern to be displayed under the low frequency driving mode; quantize the pattern to be displayed to get an average picture level, wherein the average picture level is positively correlated with a brightness of a pixel unit by which the pattern to be displayed is started and negatively correlated with a brightness of the display panel when displaying an all-white pattern; determine a corresponding anode reset voltage according to the current DBV band and the average picture level; and in the hold frame stage, output the corresponding anode reset voltage to the pixel drive circuit to reset an anode of the light emitting element.

An embodiment of the present disclosure also provides a display apparatus, including: the display panel according to any embodiment of the present disclosure.

An embodiment of the present disclosure also provides a method for displaying a display panel, wherein the display panel includes multiple pixel units arranged in an array, at least one pixel unit includes multiple sub-pixels, at least one sub-pixel includes a pixel drive circuit and a light emitting element electrically connected with the pixel drive circuit, the display panel further includes an initial signal generator, a driving mode of the display panel includes a low frequency driving mode and a normal driving mode, the low frequency driving mode including a refresh frame stage configured to write data to the pixel unit and a hold frame stage configured to hold the data written to the pixel unit, and the display method includes: in the low frequency driving mode, acquiring a current DBV band and a pattern to be displayed; quantizing the pattern to be displayed to get an average picture level, wherein the average picture level is positively correlated with a brightness of a pixel unit by which the pattern to be displayed is started and negatively correlated with a brightness of the display panel when displaying an all-white pattern; determining a corresponding anode reset voltage according to the current DBV band and the average picture level; and in the hold frame stage, outputting the corresponding anode reset voltage to the pixel drive circuit to reset an anode of the light emitting element.

Other aspects may be comprehended upon reading and understanding the drawings and a detailed description.

BRIEF DESCRIPTION OF DRAWINGS

The accompany drawings are used to provide understanding of technical solutions of the present disclosure, and form a part of the specification. The accompany drawings, together with embodiments of the present disclosure, are used to explain the technical solutions of the present disclosure, and do not constitute a limitation on the technical solutions of the present disclosure.

DETAILED DESCRIPTION

Figure 1:
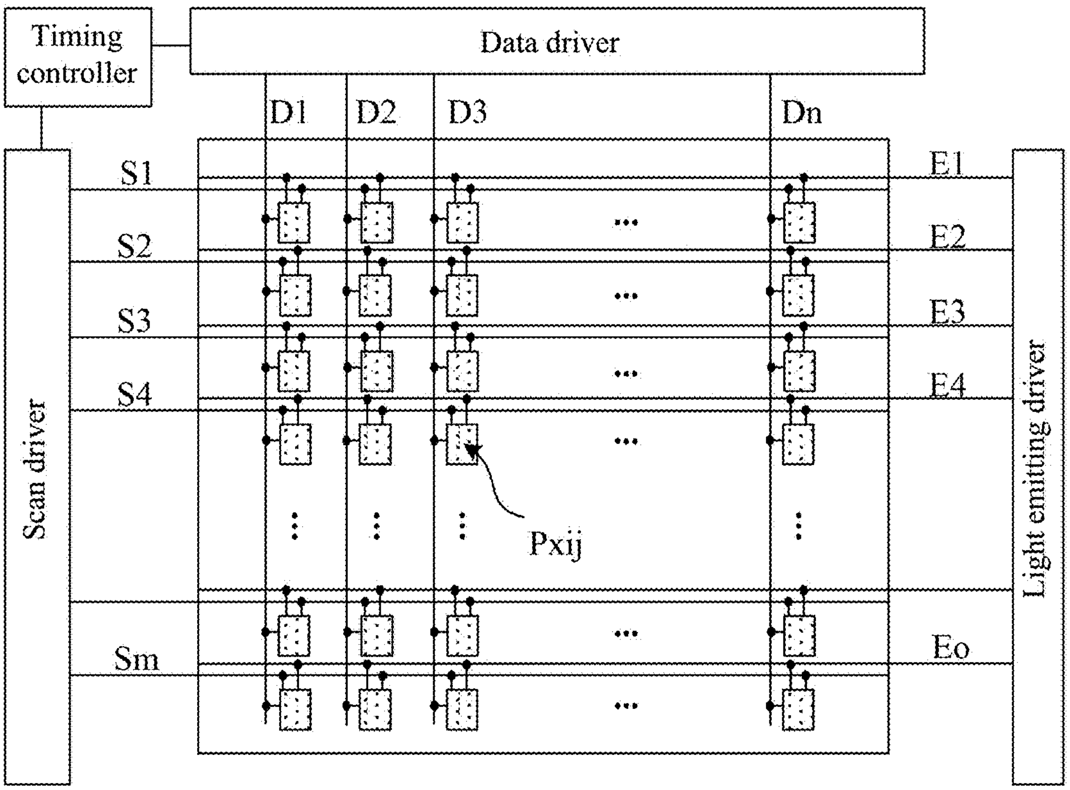
FIG. 1 is a schematic diagram of a structure of a display apparatus.

To make the objectives, technical solutions, and advantages of the present disclosure clearer, the embodiments of the present disclosure will be described in detail below in combination with the accompany drawings. Implementations may be practiced in multiple different forms. Those of ordinary skill in the art can easily understand such a fact that modes and contents may be transformed into various forms without departing from the purpose and scope of the present disclosure. Therefore, the present disclosure should not be explained as being limited to contents recorded in the following implementations only. The embodiments in the present disclosure and features in the embodiments may be randomly combined with each other in case of no conflicts.

Scales of the drawings in the present disclosure may be used as a reference in an actual process, but are not limited thereto. For example, a width-length ratio of a channel, a thickness and a spacing of each film layer, and a width and a spacing of each signal line may be adjusted according to actual needs. A quantity of pixels in a display panel and a quantity of sub-pixels in each pixel are not limited to quantities shown in the drawings. The drawings described in the present disclosure are structural schematic diagrams only, and one mode of the present disclosure is not limited to shapes, numerical values, or the like shown in the drawings.

Ordinal numerals "first", "second", "third", etc., in this specification are set not to form limits in quantity but only to avoid confusion of composition elements.

In this specification, for convenience, expressions "central", "above", "below", "front", "back", "vertical", "horizontal", "top", "bottom", "inside", "outside", etc., indicating directional or positional relationships are used to refer to the drawings to illustrate positional relationships between composition elements, not to indicate or imply that involved apparatuses or elements are required to have specific orientations and be structured and operated with the specific orientations but only to easily and simply describe this specification, and thus should not be understood as limits to the present disclosure. The positional relationships between the composition elements may be changed as appropriate according to a direction where each composition element is described. Therefore, appropriate replacements may be made according to situations without being limited to wordings described in the specification.

In this specification, unless otherwise specified and defined, terms "mounting", "mutual connection", and "connection" should be generally understood. For example, a fixed connection, or a detachable connection, or an integral connection may be made; a mechanical connection or an electric connection may be made; or a direct connection, or an indirect connection through an intermediate, or communication inside two elements may be made. Those of ordinary skill in the art can understand specific meanings of the above terms in the present disclosure according to specific situations.

In this specification, a transistor refers to a component which at least includes three terminals, i.e., a gate electrode, a drain electrode, and a source electrode. The transistor has a channel region between the drain electrode (a drain electrode terminal, a drain region, or a drain) and the source electrode (a source electrode terminal, a source region, or a source), and a current can flow through the drain electrode, the channel region, and the source electrode. It is to be noted that in this specification, the channel region refers to a region that a current mainly flows through.

In this specification, a first electrode may be the drain electrode, and a second electrode may be the source electrode; or, the first electrode may be the source electrode, and the second electrode may be the drain electrode. In cases that transistors with opposite polarities are used, or a current direction changes during work of a circuit, or the like, functions of the "source electrode" and the "drain electrode" may sometimes be exchanged. Therefore, in this specification, the "source electrode" and the "drain electrode" may be exchanged, and a "source terminal" and a "drain terminal" may be exchanged.

In this specification, the "electric connection" includes a situation in which the composition elements are connected together through an element with a certain electric action. "An element with a certain electric action" is not particularly limited as long as electric signals between the connected composition elements may be sent and received. Examples of "an element with a certain electric action" not only include an electrode and a line, but also include a switch element such as a transistor, a resistor, an inductor, a capacitor, other elements with various functions, etc.

In this specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In this specification, a "film" and a "layer" may be exchanged. For example, a "conductive layer" may be replaced with a "conductive film" sometimes. Similarly, an "insulating film" may be replaced with an "insulating layer" sometimes.

Triangle, rectangle, trapezoid, pentagon, hexagon, or the like in this specification are not strictly defined, and they may be approximate triangle, rectangle, trapezoid, pentagon, hexagon, or the like. There may be some small deformations caused by tolerance, and there may be chamfer, arc edge, deformation, etc.

In the present disclosure, "about" refers to that a boundary is defined not so strictly and numerical values within process and measurement error ranges are allowed.

FIG. 1 is a schematic diagram of a structure of a display apparatus according to an embodiment of the present disclosure. As shown in FIG. 1, an OLED display apparatus may include a timing controller, a data driver, a scan driver, a light emitting driver, and a pixel array. The pixel array may include multiple scan signal lines (S1 to Sm), multiple data signal lines (D1 to Dn), multiple light emitting signal lines (E1 to Eo), and multiple sub-pixels Pxij. In an exemplary implementation, the timing controller may provide the data driver with a gray scale value and a control signal which are suitable for a specification of the data driver, provide the scan driver with a clock signal and a scan start signal, etc., which are suitable for a specification of the scan driver, and provide the light emitting driver with a clock signal and a transmit stop signal, etc., which are suitable for a specification of the light emitting driver. The data driver may generate a data voltage to be provided to the data signal lines D1, D2, D3, . . . , and Dn using the gray scale value and the control signal that are received from the timing controller. For example, the data driver may sample the gray scale value by using the clock signal, and apply a data voltage corresponding to the gray scale value to the data signal lines D1 to Dn by taking a pixel row as a unit, wherein n may be a natural number. The scan driver may generate a scan signal to be provided to the scan signal lines S1, S2, S3, . . . , and Sm by receiving the clock signal, the scan start signal, etc., from the timing controller. For example, the scan driver may sequentially provide a scan signal with an on-level pulse to the scan signal lines S1 to Sm. For example, the scan driver may be constructed in a form of a shift register and generate a scan signal in a mode of sequentially transmitting a scan start signal provided in a form of an on-level pulse to a next-stage circuit under controlling of the clock signal, wherein m may be a natural number. The light emitting driver may generate a transmit signal to be provided to the light emitting signal lines E1, E2, E3, . . . , and Eo by receiving the clock signal, the transmit stop signal, etc., from the timing controller. For example, the light emitting driver may sequentially provide a transmit signal with an off-level pulse to the light emitting signal lines E1 to Eo. For example, the light emitting driver may be constructed in a form of a shift register, and may generate a transmit signal in a mode of sequentially transmitting a transmit stop signal provided in a form of an off-level pulse to a next-stage circuit under controlling of the clock signal, wherein o may be a natural number. The pixel array may include multiple sub-pixels Pxij. Each sub-pixel Pxij may be connected to a corresponding data signal line, a corresponding scan signal line, and a corresponding light emitting signal line, wherein i and j may be natural numbers. The sub-pixel Pxij may refer to a sub-pixel of which a transistor is connected to an i-th scan signal line and connected to a j-th data signal line.

Figure 2:
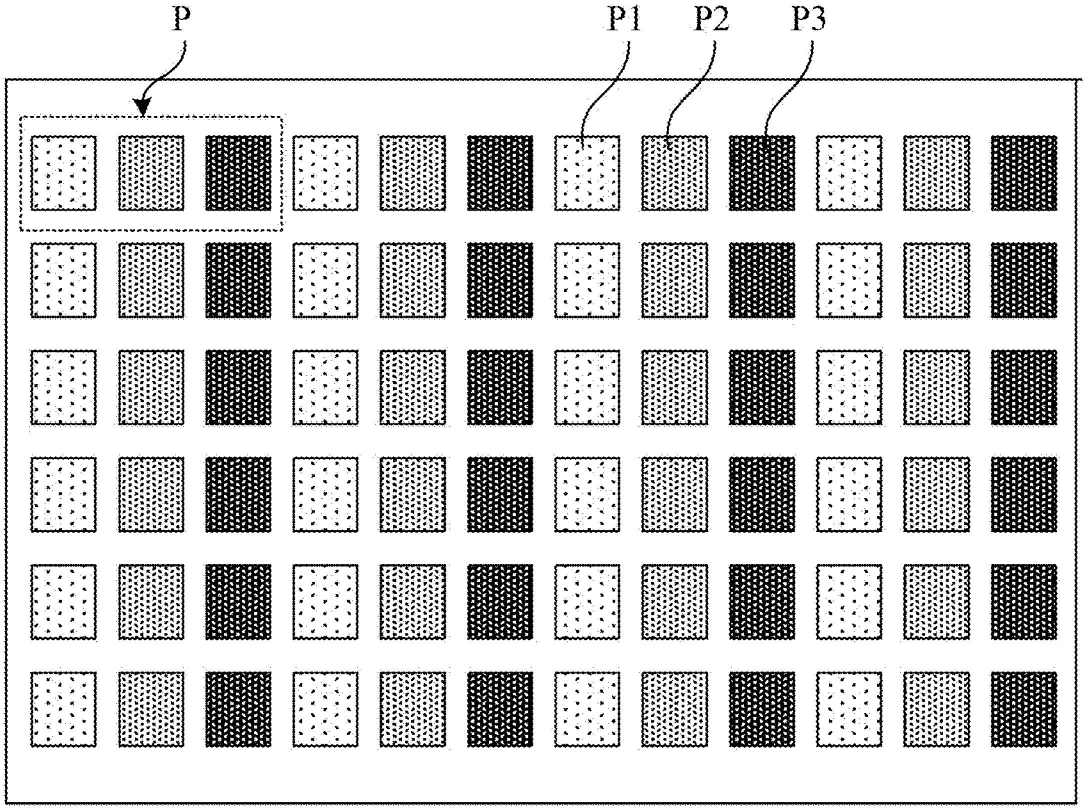
FIG. 2 is a schematic diagram of a planar structure of a display panel.

FIG. 2 is a schematic diagram of a planar structure of a display substrate according to an embodiment of the present disclosure. As shown in FIG. 2, the display substrate may include multiple pixel units P arranged in a matrix, at least one of the multiple pixel units P includes a first light emitting unit (sub-pixel) P1 that emits light of a first color, a second light emitting unit P2 that emits light of a second color, and a third light emitting unit P3 that emits light of a third color, wherein the first light emitting unit P1, the second light emitting unit P2, and the third light emitting unit P3 each include a pixel drive circuit and a light emitting device. Pixel drive circuits in the first light emitting unit P1, the second light emitting unit P2, and the third light emitting unit P3 are respectively connected with a scan signal line, a data signal line, and a light emitting signal line. A pixel drive circuit is configured to receive a data voltage transmitted by a data signal line and output a corresponding current to the light emitting device under controlling of a scan signal line and a light emitting signal line. Light emitting devices in the first light emitting unit P1, the second light emitting unit P2, and the third light emitting unit P3 are respectively connected with pixel drive circuits of light emitting units where the light emitting devices are located, and a light emitting device is configured to emit light of a corresponding brightness in response to a current outputted by a pixel drive circuit of a light emitting unit where the light emitting device is located.

In an exemplary implementation, a pixel unit P may include a red (R) light emitting unit, a green (G) light emitting unit, and a blue (B) light emitting unit, or may include a red light emitting unit, a green light emitting unit, a blue light emitting unit, and a white light emitting unit, which is not limited in the present disclosure. In an exemplary implementation, a shape of a light emitting unit in a pixel unit may be a rectangle, a rhombus, a pentagon, or a hexagon. When the pixel unit includes three light emitting units, the three light emitting units may be arranged in a mode of standing side by side horizontally, in a mode of standing side by side vertically, or in a mode like a Chinese character "品". When the pixel unit includes four light emitting units, the four light emitting units may be arranged in a mode of standing side by side horizontally, in a mode of standing side by side vertically, or in a mode of a Square, which is not limited in the present disclosure.

Figure 3:
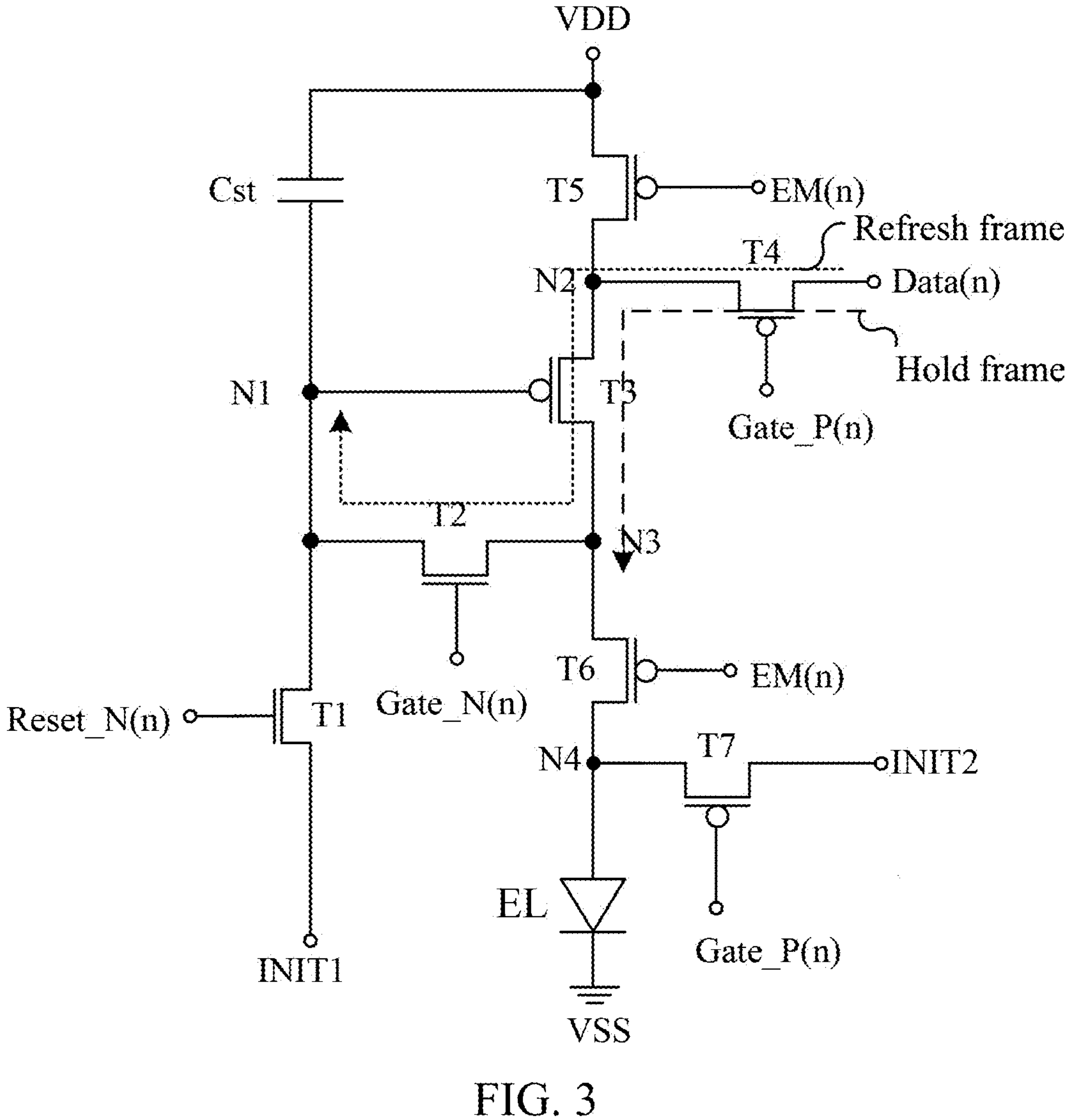
FIG. 3 is a schematic diagram of an equivalent circuit of a pixel drive circuit.

In some exemplary implementations, the pixel drive circuit may be in a structure of 3TIC, 4TIC, 5TIC, 5T2C, 6TIC, or 7TIC. FIG. 3 is a schematic diagram of an equivalent circuit of a pixel drive circuit according to an embodiment of the present disclosure. As shown in FIG. 3, the pixel drive circuit may include 7 transistors (a first transistor T1 to a seventh transistor T7), 1 storage capacitor Cst and multiple signal lines (a data signal line Data, a first scan signal line Gate_P, a second scan signal line Gate_N, a first reset signal line Reset_N, a first initial signal line INIT1, a second initial signal line INIT2, a first power supply line VDD, a second power supply line VSS, and a light emitting signal line EM).

In some exemplary implementations, a gate electrode of the first transistor T1 is connected with the first reset signal line Reset_N, a first electrode of the first transistor T1 is connected with the first initial signal line INIT1, and a second electrode of the first transistor is connected with a first node N1. A gate electrode of the second transistor T2 is connected with the second scan signal line Gate_N, a first electrode of the second transistor T2 is connected with the first node N1, and a second electrode of the second transistor T2 is connected with a third node N3. A gate electrode of the third transistor T3 is connected with a first node N1, a first electrode of the third transistor T3 is connected with a second node N2, and a second electrode of the third transistor T3 is connected with the third node N3. A gate electrode of the fourth transistor T4 is connected with the first scan signal line Gate_P, a first electrode of the fourth transistor T4 is connected with the data signal line Data, and a second electrode of the fourth transistor T4 is connected with the second node N2. A gate electrode of the fifth transistor T5 is connected with the light emitting signal line EM, a first electrode of the fifth transistor T5 is connected with the first power supply line VDD, and a second electrode of the fifth transistor T5 is connected with the second node N2. A gate electrode of the sixth transistor T6 is connected with the light emitting signal line EM, a first electrode of the sixth transistor T6 is connected with the third node N3, and a second electrode of the sixth transistor T6 is connected with a fourth node N4 (i.e., a first electrode of a light emitting element EL). A gate electrode of the seventh transistor T7 is connected with the first scan signal line Gate_P, a first electrode of the seventh transistor T7 is connected with the second initial signal line INIT2, and a second electrode of the seventh transistor T7 is connected with the fourth node N4. A first terminal of the storage capacitor Cst is connected with the first power supply line VDD, and a second terminal of the storage capacitor is connected with the first node N1.

In some exemplary implementations, the third transistor T3 to the seventh transistor T7 may be N-type thin film transistors and the first transistor T1 and the second transistor T2 may be P-type thin film transistors; or, the third transistor T3 to the seventh transistor T7 may be P-type thin film transistors and the first transistor T1 and the second transistor T2 may be N-type thin film transistors.

In some exemplary implementations, the third transistor T3 to the seventh transistor T7 may be Low Temperature Poly Silicon (LTPS) Thin Film Transistors (TFTs), and the first transistor T1 and the second transistor T2 may be Indium Gallium Zinc Oxide (IGZO) thin film transistors.

In the present embodiment, compared with a low temperature poly silicon thin film transistor, an indium gallium zinc oxide thin film transistor generates less leakage current. Therefore, an indium gallium zinc oxide thin film transistor is used as the first transistor T1 and the second transistor T2, so that generated leakage current may be significantly reduced, thereby solving a problem of flickering of a display panel at a low frequency and a low brightness. In the pixel drive circuit according to the embodiment of the present disclosure, good switching characteristics of LTPS-TFTs and low leakage characteristics of Oxide-TFTs are combined, so that low-frequency driving (1 Hz to 60 Hz) may be achieved, thereby significantly reducing a power consumption of a display screen.

In some exemplary implementations, a second electrode of the light emitting element EL is connected with the second power supply line VSS, a signal of the second power supply line VSS is a low-level signal, and a signal of the first power supply line VDD is a high-level signal continuously provided. For an n-th display line, the second scan signal line Gate_N is Gate_N (n), and the first reset signal line Reset_N is Gate_N (n−1). A signal of the first reset signal line Reset_N of the present display line and a signal of the second scan signal line Gate_N in a pixel drive circuit of a previous display line may be a same signal, so as to reduce signal lines of the display panel and achieve a narrow frame of the display panel.

In some exemplary implementations, the light emitting element EL may be an Organic light emitting Diode (OLED), including a first electrode (anode), an organic light emitting layer, and a second electrode (cathode) that are stacked.

Figure 4:
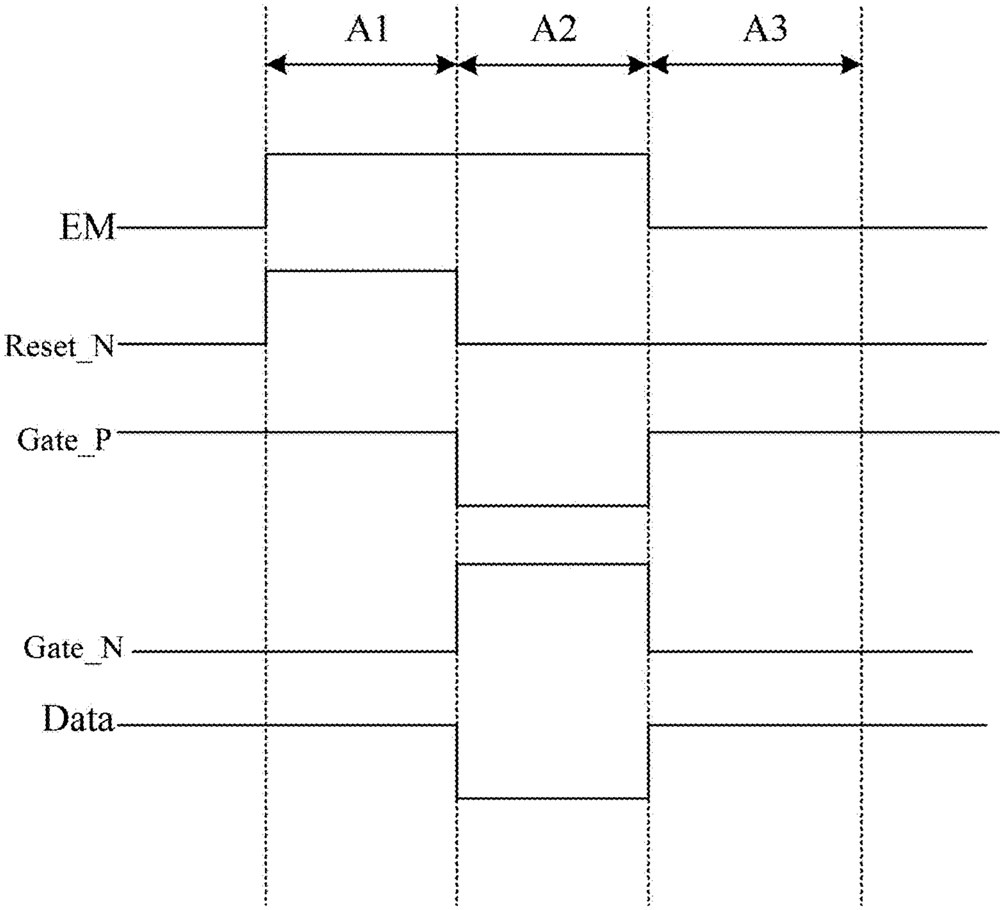
FIG. 4 is a working timing diagram of the pixel drive circuit shown in FIG. 3 in a normal driving mode.

FIG. 4 is a working timing diagram of a pixel drive circuit according to an embodiment of the present disclosure. An exemplary embodiment of the present disclosure will be described below through a working process of a pixel drive circuit exemplified in FIG. 4. The pixel drive circuit in FIG. 3 includes seven transistors (a first transistor T1 to a seventh transistor T7) and one storage capacitor Cst. Description is given in the present embodiment by taking the third transistor T3 to the seventh transistor T7 are P-type transistors, and the first transistor T1 and the second transistor T2 are N-type transistors.

In some exemplary implementations, the method for driving the pixel drive circuit may include a reset stage A1, a compensation stage A2, and a light emitting stage A3.

At the reset stage A1: the first reset signal line Reset_N outputs a high-level signal, the first transistor T1 is turned on, a voltage of the first node N1 is reset to a first initial voltage$V_{init1}$ supplied by the first initial signal line INIT1. A high-level signal of the light emitting signal line EM makes the fifth transistor T5 and the sixth transistor T6 be turned off, and at this stage the light emitting element EL does not emit light.

At the compensation stage A2: the first scan signal line Gate_P outputs a low-level signal, the second scan signal line Gate_N outputs a high-level signal, the seventh transistor T7, the fourth transistor T4, and the second transistor T2 are turned on, a voltage of the fourth node N4 is reset to a second initial voltage $V_{init2}$ supplied by the second initial signal line INIT2, and at this stage, due to the first node N1 at a low level, the third transistor T3 is turned on. Meanwhile, the data signal line Data outputs a data drive signal supplied to the first node N1 through the fourth transistor T4, the second node N2, the turned-on third transistor T3, the third node N3, and the turned-on second transistor T2 to write a voltage Vdata+Vth to the first node N1, wherein Vdata is a voltage of the data drive signal and Vth is a threshold voltage of the third transistor T3 (drive transistor).

At the light emitting stage A3: the light emitting signal line EM outputs a low-level signal, the fifth transistor T5 and the sixth transistor T6 are turned on. A power supply voltage outputted by the first power supply line VDD provides a drive voltage to the first electrode (i.e., the fourth node N4) of the light emitting element EL through the turned-on fifth transistor T5, the third transistor T3, and the sixth transistor T6 to drive the light emitting element EL to emit light. It should be understood that the pixel drive circuit shown in FIG. 3 may also have other driving modes, for example, the seventh transistor T7 may be turned on at the reset stage A1 or the like.

In a drive process of the pixel drive circuit, a drive current flowing through the third transistor T3 (i.e., the drive transistor) is decided by a voltage difference between a gate electrode of the third transistor T3 and a first electrode. Since a voltage at the first node N1 is Vdata+Vth, the drive current of the third transistor T3 is:

$$I = K*(Vgs-Vth)^2 = K*[(Vdata+Vth-Vdd)-Vth]^2 = K*[(Vdata-Vdd)]^2$$

Herein, I is the drive current flowing through the third transistor T3, i.e., a drive current for driving the light emitting element EL, K is a constant, Vgs is the voltage difference between the gate of the third transistor T3 and the first electrode, Vth is a threshold voltage of the third transistor T3, Vdata is a voltage of the data drive signal outputted by the data signal line Data, and Vdd is a power supply voltage outputted by the first power supply line VDD.

It may be seen from the above formula that a current I flowing through the light emitting element EL is unrelated to the threshold voltage Vth of the third transistor T3, so that an influence of the threshold voltage Vth of the third transistor T3 on the current I is eliminated, and uniformity of brightness is ensured.

Based on the above working sequence, in this pixel drive circuit, residual positive charges of the light emitting element EL, after the light emitting element EL emitting light last time, are eliminated, compensation to a gate voltage of the third transistor is achieved, an influence of drift of the threshold voltage of the third transistor on a drive current of the light emitting element EL is avoided, and uniformity of a displayed image and display quality of the display panel are improved.

In the pixel drive circuit according to the embodiment of the present disclosure, by initializing the fourth node N4 to the second initial voltage $V_{init2}$ supplied by the second initial signal line INIT2 and initializing the first node N1 to the first initial voltage $V_{init1}$ supplied by the first initial signal line INIT1, which can adjust the reset voltage of the light emitting element EL and the reset voltage at the first node N1 respectively, thereby achieving better display effect and improving problem such as flickering at a low frequency or the like.

Figure 5:
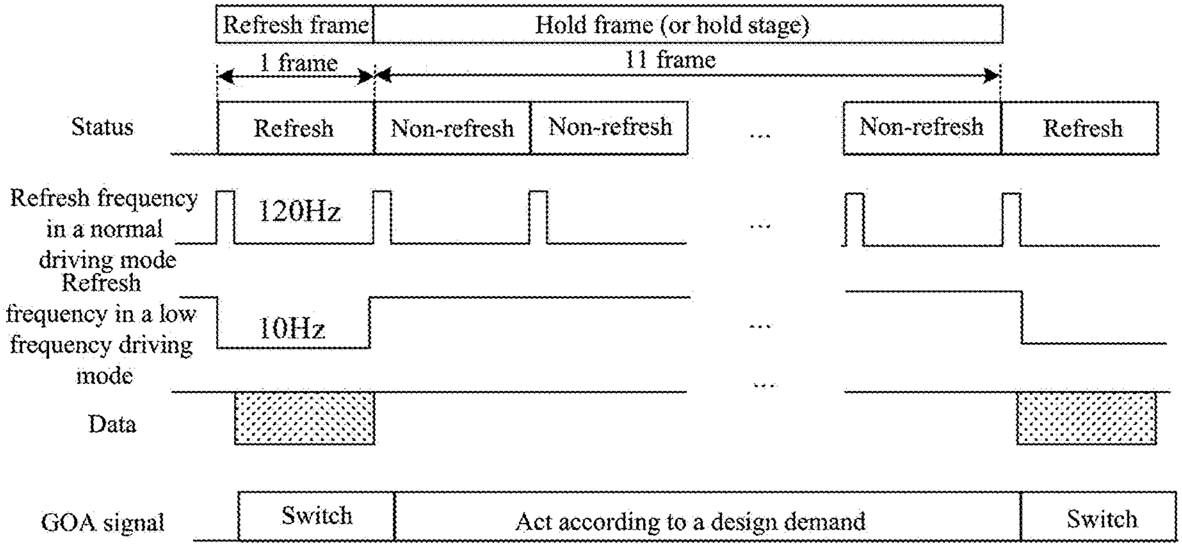
FIG. 5 is a working timing diagram of the pixel drive circuit shown in FIG. 3 in a low frequency driving mode.

For the pixel drive circuit according to the embodiment of the present disclosure, a Low Temperature Polycrystalline Oxide (LTPO) technology is used, and the first transistor T1 and the second transistor T2 use Oxide TFT, which effectively reduces the leakage current of the first node N1 and may achieve multi-frequency switching. As shown in FIG. 5, assuming that a refresh frequency of the pixel drive circuit is 120 Hz in a normal driving mode and 10 Hz in a low frequency driving mode, when the display panel is switched to the low frequency driving mode, one display period is divided into one refresh frame stage and multiple hold frame stages. The refresh frame is a pattern refresh frame, i.e., a Data update frame. In the hold frame data is held. The data is locked at the first node N1 (the control electrode of the drive transistor), and is not to be refreshed. However, in order to keep flicker invisible, the light emitting element EL usually needs to be continuously reset to form a display frequency of 120 Hz or else. Therefore, in a hold frame stage, an anode of the light emitting element EL may also be reset according to a frequency of 120 Hz or else, that is, the EM needs to be continuously refreshed.

Figure 6:
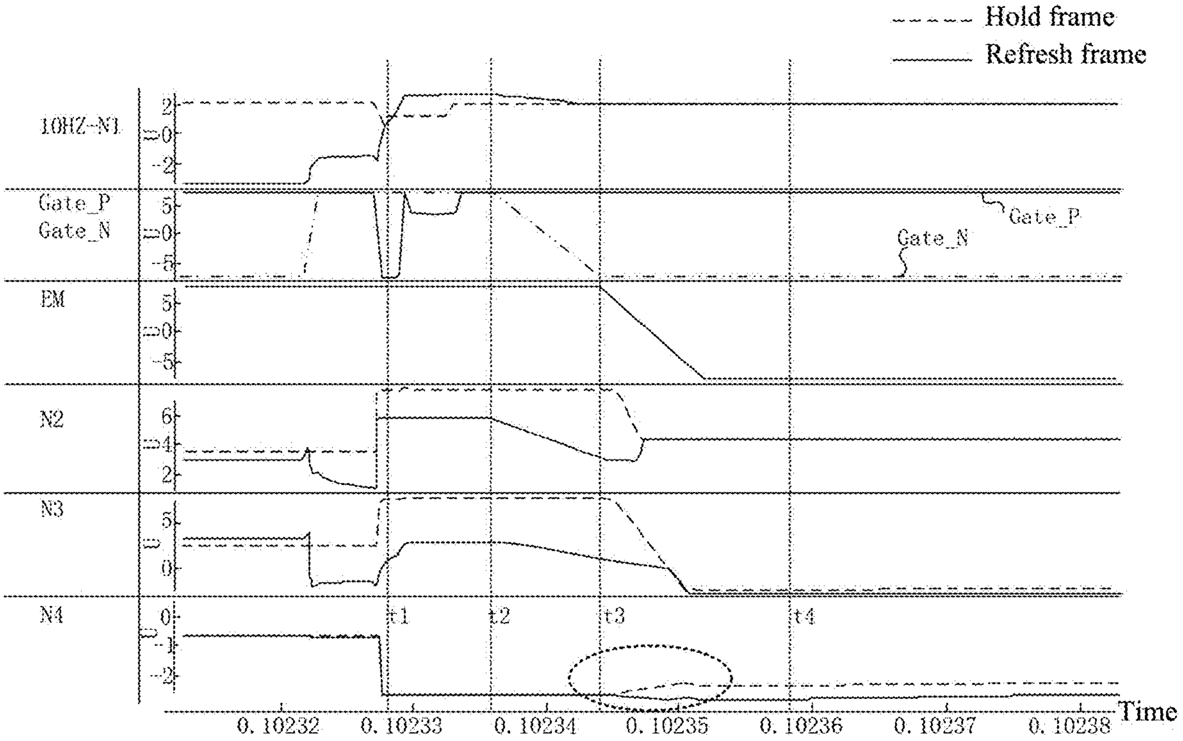
FIG. 6 is a voltage actual-measurement diagram of a first node to a fourth node of the pixel drive circuit shown in FIG. 3 in a low frequency driving mode.

As shown in FIGS. 3 and 6, in the refresh frame stage, the second scan signal line Gate_N inputs a high level, and a data signal outputted by the data signal line Data is updated and written to the storage capacitor Cst; in the hold frame stage, the second scan signal line Gate_N inputs a low level, and the data signal outputted by the data signal line Data is fixed and data is not written to the storage capacitor Cst. Therefore, in the refresh frame stage and the hold frame stage, there is a difference in the voltage of the third node N3, and the voltage of the third node N3 in the hold frame stage is higher than the voltage of the third node N3 in the refresh frame stage, so that opening time of the sixth transistor T6 in the hold frame stage is earlier than opening time of the sixth transistor T6 in the refresh frame stage. Therefore, precharge time of the fourth node N4 in the hold frame stage is longer than precharge time of the fourth node N4 in the refresh frame stage, thereby causing the voltage of the fourth node N4 in the hold frame stage to be higher than the voltage of the fourth node N4 in the refresh frame stage, that is, there is a brightness difference between a brightness of the light emitting element in the hold frame stage and a brightness of the light emitting element in the refresh frame stage, which is one of main reasons causing the flicker of a pattern in the low frequency driving mode and flicker of a pattern in a high-low frequency driving mode switching process.

Figure 7:
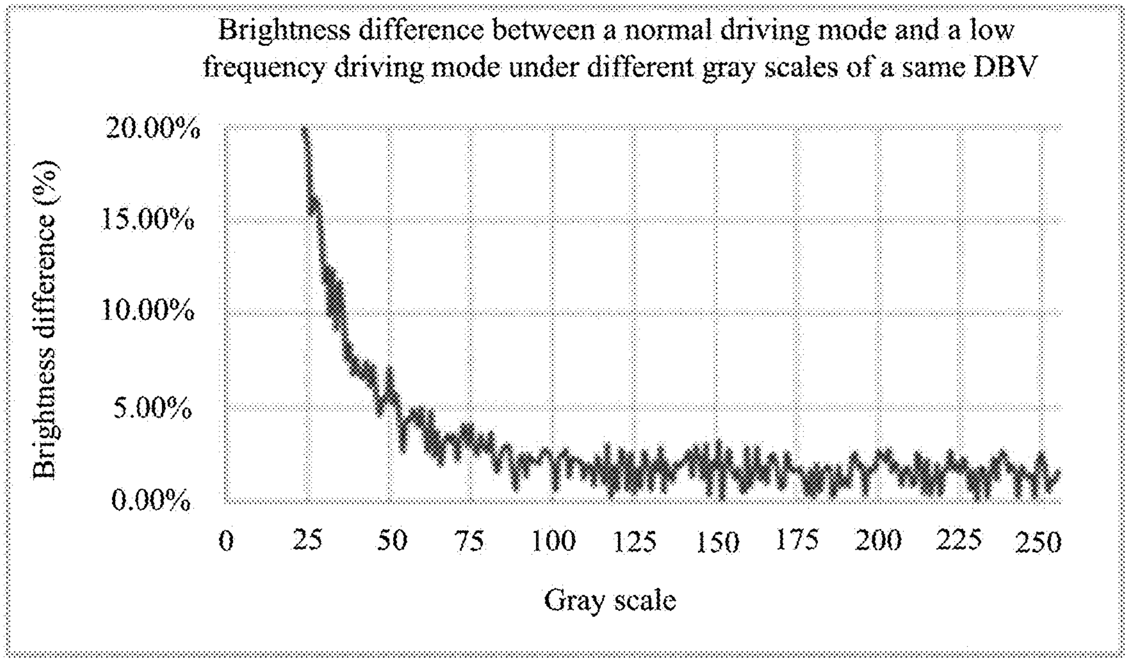
FIG. 7 is a schematic diagram of a brightness difference between a normal driving mode and a low frequency driving mode under different gray scales of a same DBV.

FIG. 7 is an actual measure diagram of a brightness difference between a normal driving mode (data refresh frequency 120 Hz) and a low frequency driving mode (data refresh frequency 10 Hz) under different gray scales of a same Display Brightness Value (DBV). The brightness is relatively high and a current I1 flowing through the light emitting element is relatively large in high gray scale, while the brightness is relatively low and a current I2 flowing through the light emitting element is relatively small in low gray scale, that is, I1>I2. Due to an inevitable influence of a TFT preparation process, a certain disturbance current ΔI will be produced. An influence of the disturbance current ΔI on high and low gray scales is ΔI/I1<ΔI/I2, that is, at low gray scale, the influence of the disturbance current is greater, and the influence on the brightness difference and a color difference is also greater.

In some embodiments, for different gray scales under a same DBV, in addition to data signal voltages of the data signal line Data, other drive voltages are identical, which cannot meet requirement of that high and low gray scales under the same DBV should all meet relatively small brightness and chrominance deviations. Therefore, finding an effective method to reduce the disturbance current Δ1 and reduce a voltage difference of the fourth node N4 are an effective guarantee to improve the brightness difference of the different gray scales under the same DBV.

Figure 8:
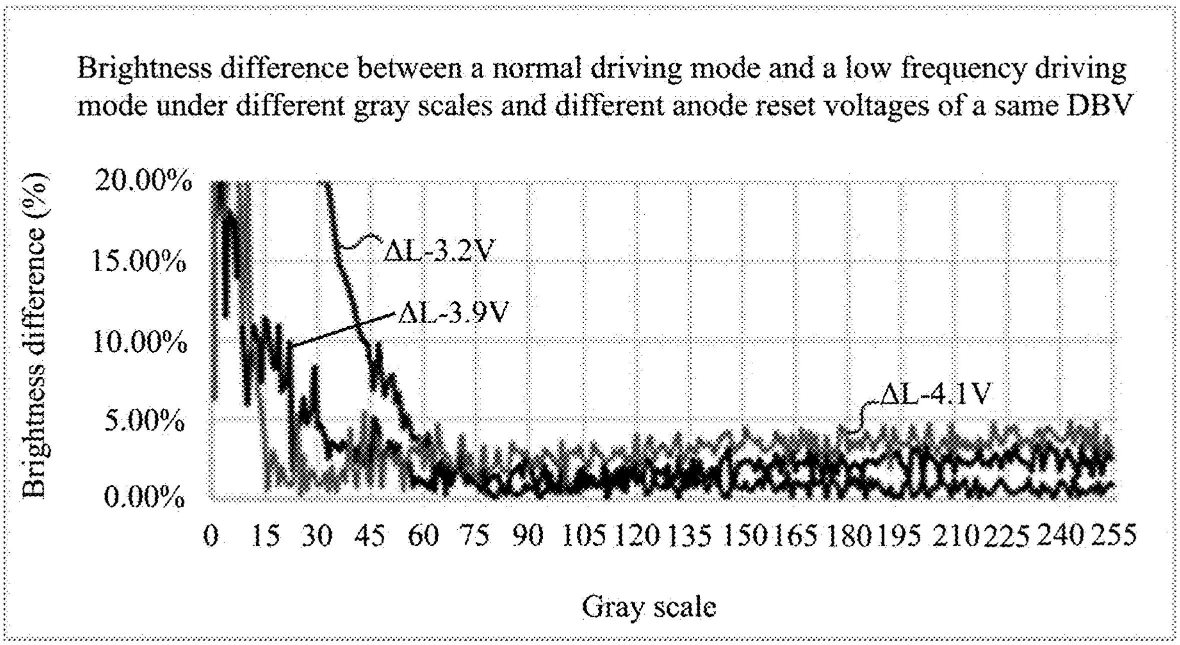
FIG. 8 is a schematic diagram of a brightness difference between a normal driving mode and a low frequency driving mode under different gray scales and different anode reset voltages of a same DBV.

Using different anode reset voltages (i.e. the second initial voltage $V_{init2}$ supplied by the second initial signal line INIT2) may change the voltage of the fourth node N4 under high and low gray scales, thereby changing the voltage difference of the fourth node N4 before and after high and low frequency switching, thereby improving the brightness difference between high and low gray scales in a frequency switching process. FIG. 8 is an actual measure diagram of a brightness difference at different anode reset voltages $V_{init2}$ and under different gray scales in the hold frame stage, wherein ΔL-3.2, ΔL-3.9, ΔL-4.1 denotes brightness differences in cases of $V_{init2}$=3.2V, $V_{init2}$=3.9V, $V_{init2}$=4.1V respectively. Referring to FIG. 8, different anode reset voltages $V_{init2}$ have relatively great influence on brightness differences of different gray scales. Using different anode reset voltages $V_{init2}$ under different gray scales in the hold frame stage may effectively improve brightness differences of different gray scales under the same DBV in the frequency switching process and effectively improve image quality level of an LTPO display module.

An embodiment of the present disclosure provides a display panel, including multiple pixel units arranged in an array, at least one pixel unit including multiple sub-pixels, at least one sub-pixel including a pixel drive circuit and a light emitting element electrically connected with the pixel drive circuit, the display panel further including an initial signal generator, a driving mode of the display panel including a low frequency driving mode and a normal driving mode, and the low frequency driving mode including a refresh frame stage configured to write data to the pixel unit and a hold frame stage configured to hold the data written to the pixel unit.

Figure 9:
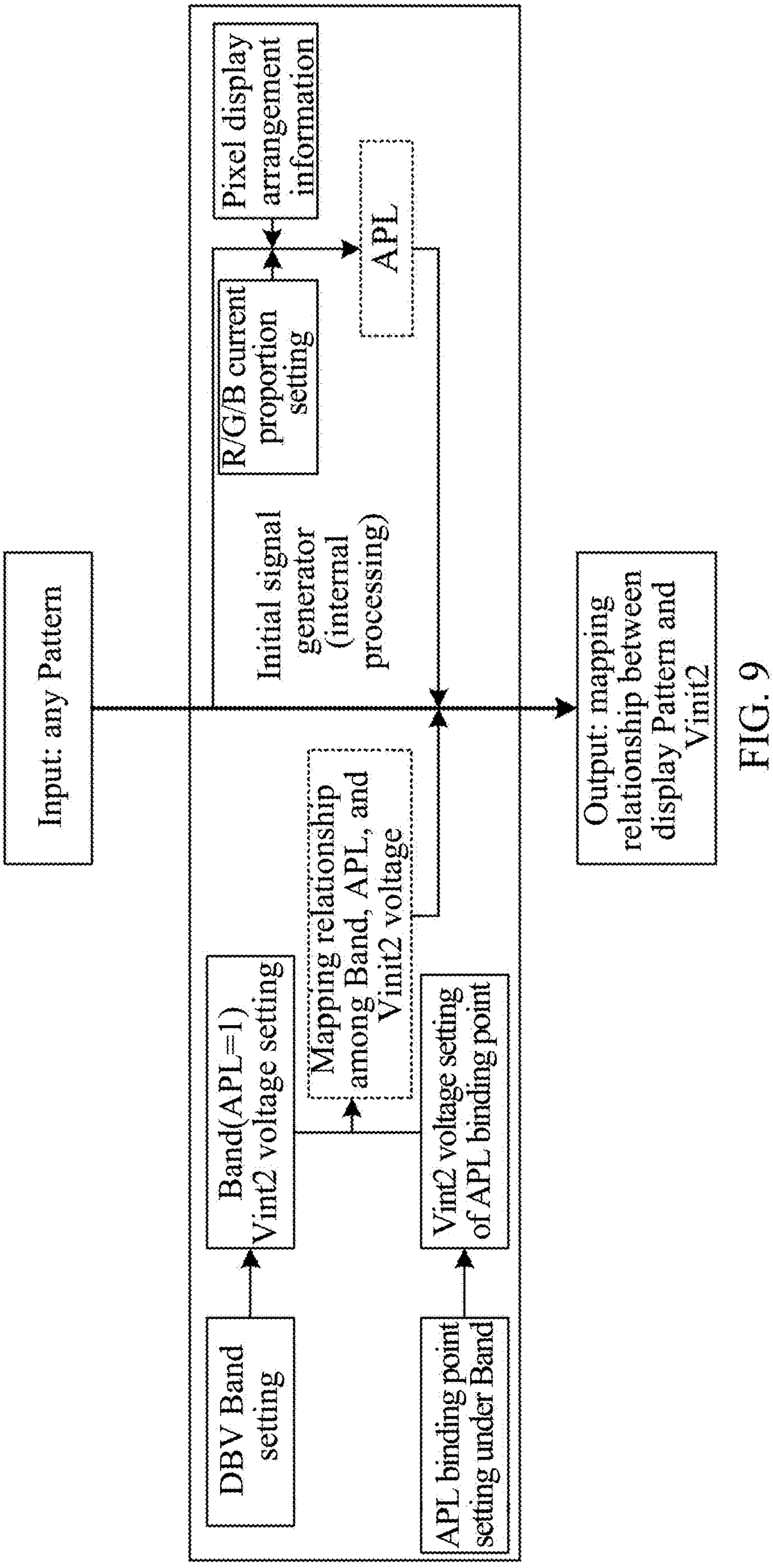
FIG. 9 is a schematic diagram of a process in which an initial signal generator processes an inputted pattern to be displayed according to pre-stored internal data according to an exemplary embodiment of the present disclosure.

As shown in FIG. 9, the initial signal generator is configured to acquire a current DBV band and a pattern to be displayed in the low frequency driving mode; quantize the pattern to be displayed to get an average picture level, wherein the average picture level is positively correlated with a brightness of a pixel unit by which the pattern to be displayed is started and negatively correlated with a brightness of the display panel when displaying an all-white pattern; determine a corresponding anode reset voltage $V_{init2}$ according to the current DBV band and the average picture level; and in the hold frame stage, output the corresponding anode reset voltage $V_{init2}$ to the pixel drive circuit to reset an anode of the light emitting element.

The display panel according to the embodiment of the present disclosure gets the average picture level by quantization processing of the initial signal generator on the pattern to be displayed, the average picture level being positively correlated with the brightness of the pixel unit by which the pattern to be displayed is started and negatively correlated with the brightness of the display panel when displaying an all-white pattern, and determines the corresponding anode reset voltage according to the current DBV band and the average picture level, thereby providing a dynamic adjustment method of the anode reset voltage. Different anode reset voltages are used in different gray scales of hold frames to balance voltage fluctuation of the fourth node N4 in high gray scale and low gray scale, and brightness differences between refresh frames and hold frames of high and low gray scales are effectively reduced. Illustratively, the initial signal generator may be implemented by an Integrated Circuit (IC) chip in the display panel. However, this is not limited in embodiments of the present disclosure.

The display panel according to an embodiment of the present disclosure quantifies and processes a display Pattern into APL through the initial signal generator, which may effectively achieve simplification of data processing of any complex display Pattern and is beneficial to internal logic algorithm processing of the initial signal generator. In an embodiment of the present disclosure, dynamic adjustment of anode reset voltages of different display Patterns under a condition of a constant DBV may be achieved, so as to achieve brightness and chrominance differences in the high-low frequency switching process under different colors, different gray scales, and different brightnesses. The dynamic adjustment mode of anode reset voltages in the embodiment of the present disclosure is only used in the hold frame stage, and does not affect Gamma Tuning in the refresh frame stage and the normal driving mode. It has high feasibility and strong practicability in the embodiment of the present disclosure.

In some exemplary implementations, the average picture level is ≤1.

In some exemplary implementations, the average picture level is equal to a sum of sub-average picture levels of the multiple sub-pixels, and a sub-average picture level of each sub-pixel is equal to a product of an average gray scale and a current proportion of each sub-pixel.

In an embodiment of the present disclosure, any Pattern to be displayed is quantized to get APL, and the APL of any Pattern to be displayed is composed of gray scales and current proportions of multiple sub-pixels for weighted contribution.

In some exemplary implementations, an average gray scale $K_x$ of a sub-pixel $P_x$ may be calculated by the following formula:

$$K_x = \frac{\sum_{j=1}^{n}\sum_{i=1}^{m}\left(G_{ij_x}/G_{max}\right)^r}{m\times n},$$

wherein m is a quantity of vertical pixel units, n is a quantity of horizontal pixel units, $G_{ij_x}$ is a gray scale displayed for the sub-pixel $P_x$ in a pixel unit of an i-th row and a j-th column when the pattern to be displayed is displayed, $G_{max}$ is a maximum gray scale value displayed for each sub-pixel, and r is a gamma value.

In some exemplary implementations, a current proportion $R_x$ of the sub-pixel $P_x$ may be calculated by the following formula:

$$R_x = \frac{I_{EL\_x}}{\sum_{a=1}^{A} I_{EL\_a}},$$

wherein x is a natural number between 1 and A, A is a quantity of sub-pixels included in a pixel unit, and $I_{EL\_x}$ is a current consumed by the sub-pixel $P_x$ when the white pattern is displayed for full screen.

Illustratively, the pixel unit may include a red sub-pixel, a blue sub-pixel, and a green sub-pixel. However, this is not limited in the present disclosure.

Illustratively, pressing a display gray scale of 8 bit for example (i.e. 0 to 255 gray scales), the average picture level APL may be calculated by the following formula:

$$APL_{red} = \frac{\sum_{j=1}^{n}\sum_{i=1}^{m}\left(G_{ij_{red}}/255\right)^{2.2}}{m\times n}\times R_{red};$$

$$APL_{green} = \frac{\sum_{j=1}^{n}\sum_{i=1}^{m}\left(G_{ij_{green}}/255\right)^{2.2}}{m\times n}\times R_{green};$$

$$APL_{blue} = \frac{\sum_{j=1}^{n}\sum_{i=1}^{m}\left(G_{ij_{blue}}/255\right)^{2.2}}{m\times n}\times R_{blue};$$

$$APL = APL_{red} + APL_{green} + APL_{blue}.$$

Herein, m×n is a resolution of a displayed image, $APL_{red}$, $APL_{green}$, and $APL_{blue}$ are sub-average picture levels of red sub-pixels, green sub-pixels, and blue sub-pixels respectively, m is a quantity of vertical pixel units, n is a quantity of horizontal pixel units, $G_{ij_{red}}$, $G_{ij_{green}}$, and $G_{ij\ blue}$ are respectively gray scales displayed for the red sub-pixel, the green sub-pixel, and the blue sub-pixel in the pixel unit of the i-th row and the j-th column when the pattern to be displayed is displayed, gray scales displayed by various sub-pixels are between 0 and 255, $R_{red}$, $R_{green}$, and $R_{blue}$ are respectively current proportions of the red sub-pixels, the green sub-pixels, and the blue sub-pixels when the white pattern is displayed for full screen (W Gray 255 pattern, R/G/B sub-pixels are all lit, and are all G255 gray scale).

$$\text{Herein, } R_{red} = \frac{I_{EL\_red}}{I_{EL\_red} + I_{EL\_green} + I_{EL\_blue}};$$

$$R_{green} = \frac{I_{EL\_green}}{I_{EL\_red} + I_{EL\_green} + I_{EL\_blue}};$$

$$R_{blue} = \frac{I_{EL\_blue}}{I_{EL\_red} + I_{EL\_green} + I_{EL\_blue}}.$$

Herein, $I_{EL\_red}$, $I_{EL\_green}$, and $I_{EL\_blue}$ are respectively currents consumed by the red sub-pixels, the green sub-pixels, and the blue sub-pixels when the white pattern is displayed for full screen, and $R_{red}+R_{green}+R_{blue}=1$.

Because brightness is positively correlated with current, the greater the brightness is, the greater the current is; on the contrary, the less the brightness is, the less the current is. Therefore, in the embodiment of the present disclosure, a brightness when the display panel displays a full white pattern (i.e., the display panel displays a white pattern for full screen) is positively correlated with a size of m×n×($I_{EL\_red}+I_{EL\_green}+I_{EL\_blue}$), a brightness of the pixel unit by which the pattern to be displayed is started is positively correlated with a size of $\{_{j=1}{}^{n}\Sigma_{i=1}{}^{m}(G_{ij_{red}}/255)^{2.2}\times R_{red}+\Sigma_{j=1}{}^{n}\Sigma_{i=1}{}^{m}(G_{ij_{green}}/255)^{2.2}+R_{green}+\Sigma_{j=1}{}^{n}\Sigma_{i=1}{}^{m}(G_{ij_{blue}}/255)^{2.2}+R_{blue}\}$. Combined with the above formula, that is, an average picture level is positively correlated with the brightness of the pixel unit by which the pattern to be displayed is started, and negatively correlated with the brightness when the display panel displays a full white pattern.

Figure 10:
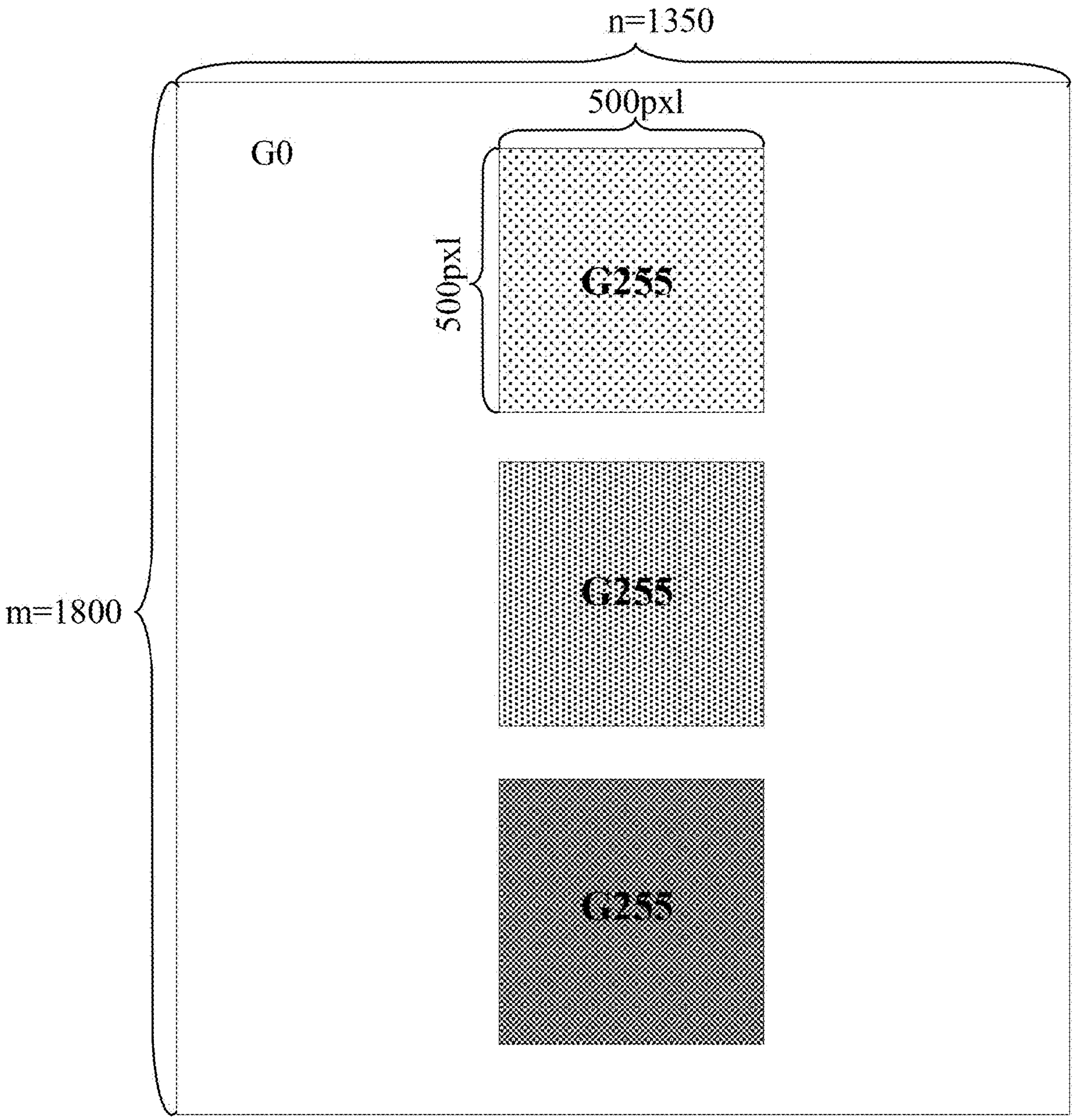
FIG. 10 is a schematic diagram of a display pattern (in which three 500×500 pixel R/G/B pixels are displayed on 1800×1350 G0 background) according to an exemplary embodiment of the present disclosure.

Illustratively, as shown in FIG. 10, three blocks of R/G/B pixels of 500×500 pixel units are displayed on a background of 1800×1350 G0, wherein when a white pattern is displayed for full screen, a current consumed by R pixels is 50 mA, a current consumed by G pixels is 150 mA, and a current consumed by B pixels is 50 mA, then methods for calculating a sub-average picture level of R/G/B sub-pixels and a total APL are as follows, APL of any Pattern being≤1.

$$APL_{red} = \frac{500\times 500\times (255/255)^{2.2}}{1800\times 1350}\times\frac{50}{50+150+50} = 0.026;$$

$$APL_{green} = \frac{500\times 500\times (255/255)^{2.2}}{1800\times 1350}\times\frac{150}{50+150+50} = 0.051;$$

$$APL_{blue} = \frac{500\times 500\times (255/255)^{2.2}}{1800\times 1350}\times\frac{50}{50+150+50} = 0.026;$$

$$APL = APL_{red} + APL_{green} + APL_{blue} = 0.102.$$

Figure 11:
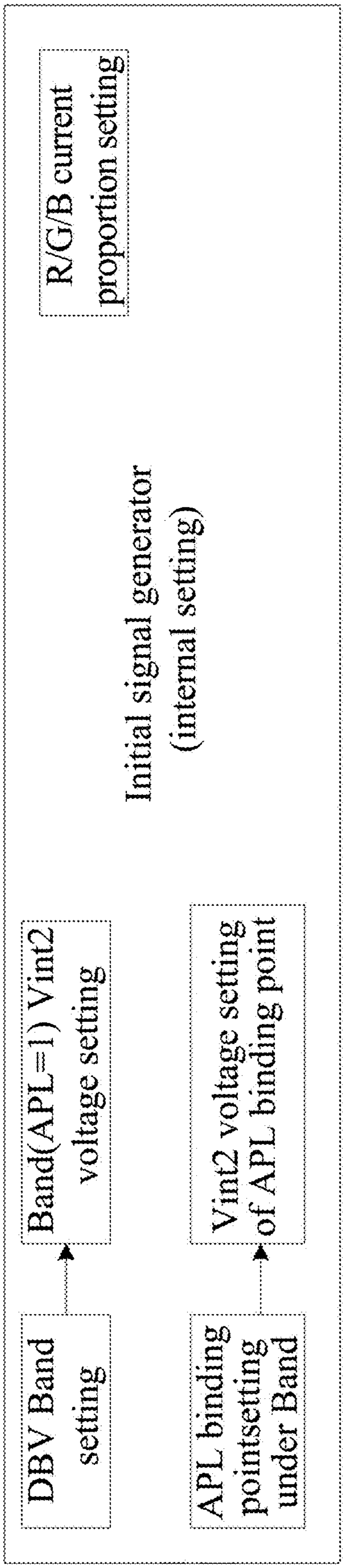
FIG. 11 is a schematic diagram of pre-stored internal data of an initial signal generator according to an exemplary embodiment of the present disclosure.

In some exemplary implementations, as shown in FIG. 11, the initial signal generator is further configured to: store in advance a corresponding relationship table of a DBV band, an average picture level binding point (the binding point in the embodiment of the present disclosure refers to a test value), and an anode reset voltage, wherein the DBV band includes a first brightness band to an N-th brightness band, maximum gray scale brightnesses from the first brightness band to the N-th brightness band increase in turn, each DBV band includes a first average picture level binding point to an M-th average picture level binding point, and average picture levels from the first average picture level binding point to the M-th average picture level binding point increase in turn.

In some exemplary embodiments, an average picture level of the first average picture level binding point is 0%, and an average picture level of the M-th average picture level binding point is 100%.

In some exemplary implementations, M is ≥5.

Figure 12:
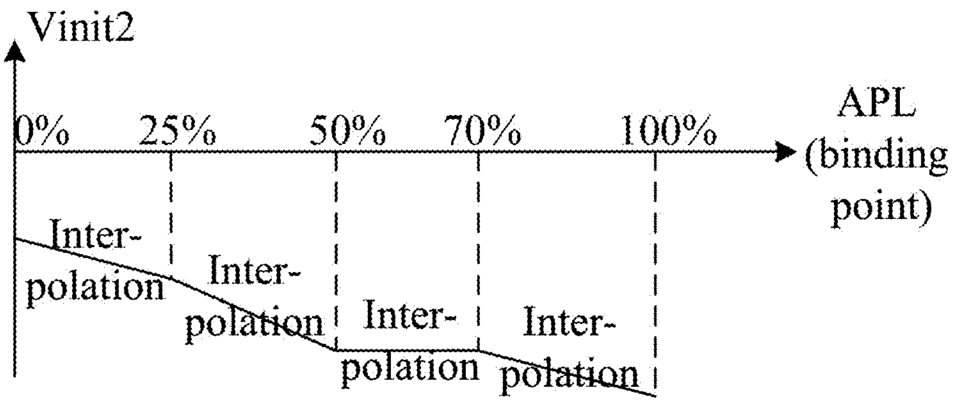
FIG. 12 is a schematic diagram of an interpolation method of an APL binding point and an anode reset voltage according to an exemplary embodiment of the present disclosure.

In an embodiment of the present disclosure, APL binding points may be arbitrarily set according to requirements, but in order to facilitate interpolation, APL binding points of various Bands may be consistent, and APL=0 and APL=1 are binding points that must be set. Since power consumption optimization is not obvious when a quantity of APL binding points is too small, and IC storage space is occupied when the quantity of the APL binding points is too large, in an embodiment of the present disclosure, a quantity of pre-stored APL binding points is ≥5. Illustratively, as shown in FIG. 12, using 0, 25%, 50%, 70%, and 100% as APL binding points, only anode reset voltages $V_{init2}$ of hold frames of the APL binding points needs to be stored in advance in the initial signal generator, and anode reset voltages $V_{init2}$ between the APL binding points are obtained by the initial signal generator through linear difference calculation.

Selection of APL binding points and the setting of anode reset voltages $V_{init2}$ of the hold frames are obtained by a brightness difference ΔL curve (as shown in FIG. 8) under different driving modes tested by actual products. When the brightness difference in low gray scale is relatively large, a few more APL binding points may be set in low gray scale. The setting of an anode reset voltage $V_{init2}$ corresponding to each APL binding point may be designed to an actual value of $V_{init2}$, and may also be defined according to a relative percentage value of the anode reset voltage $V_{init2}$ when APL=1.

In some exemplary implementations, a quantity of DBV bands stored in advance is ≥10.

Figure 13:
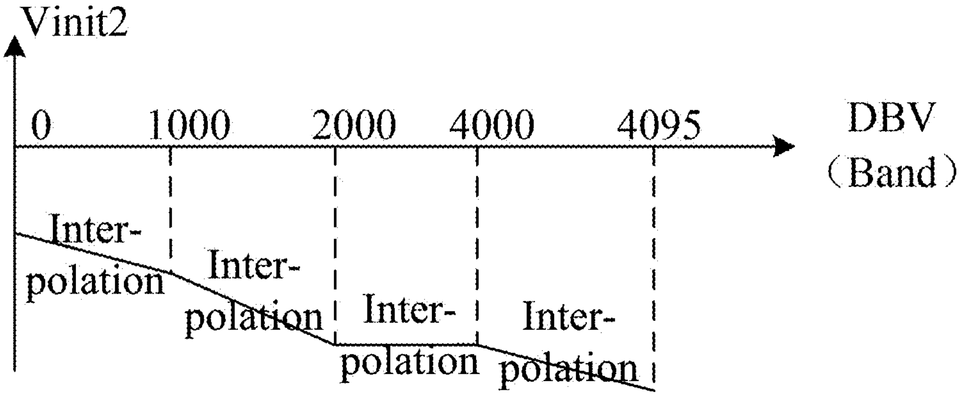
FIG. 13 is a schematic diagram of an interpolation method of DBV band points and anode reset voltages according to an exemplary embodiment of the present disclosure.

In an embodiment of the present disclosure, a quantity of the DBV bands stored in advance may be arbitrarily set according to requirements. Illustratively, the quantity of the DBV bands stored in advance is ≥10. As shown in FIG. 13, using 0, 1000, 2000, 4000, 4095 as pre-stored DBV bands, in the initial signal generator, only anode reset voltages $V_{init2}$ of APL binding points (APL=0 and APL=1 are binding points that must be set) of the DBV bands need to be preset. When an actual DBV Band is not a pre-stored DBV band, since the APL binding points of various DBV Bands are consistent, an anode reset voltage $V_{init2}$ of the actual DBV Band is obtained by the initial signal generator through linear difference calculation.

Illustratively, assuming that a maximum DBV Band of the module is 4095 (1000 nits), i.e. N=4095, by Tuning anode reset voltages of multiple different DBV Bands and different APLs, a corresponding relationship table of pre-stored DBV bands, average picture level binding points, and anode reset voltages are obtained.

Firstly, we select DBV Bands to be stored in advance as DBV0 (0 nit), DBV1000 (200 nits), DBV2000 (400 nits), DBV4000 (600 nits), and DBV4095 (1000 nits), respectively, and select APL binding points to be stored in advance as 0% (G0), 25% (G64), 50% (G127), 70% (G178), and 100% (G255), respectively.

Then, under different DBV Bands, dynamic Tuning is performed for an anode reset voltage $V_{init2}$ when APL is 100% (G255 full screen display), to get an anode reset voltage $V_{init2}$ at DBV0 set to −4.2V, an anode reset voltage $V_{init2}$ at DBV1000 set to −3.8V, an anode reset voltage $V_{init2}$ at DBV2000 set to −3.7V, an anode reset voltage $V_{init2}$ at DBV4000 set to −3.5, an anode reset voltage $V_{init2}$ at DBV4095 set to −3.3, as shown in Table 1.

TABLE 1

| | Binding point | | | | |
|---|---|---|---|---|---|
| Band | APL 0% | APL 25% | APL 50% | APL 70% | APL 100% |
| DBV4095 | | | | | −3.3 |
| DBV4000 | | | | | −3.5 |
| DBV2000 | | | | | −3.7 |
| DBV1000 | | | | | −3.8 |
| DBV0 | | | | | −4.2 |

Then, tuning is performed for anode reset voltages $V_{init2}$ corresponding to different APL binding points under various DBV Bands, respectively.

Take DBV 4095Band as an embodiment. A corresponding anode reset voltage $V_{init2}$ when DBV4095 APL 100% has been obtained in a previous act is −3.3V. Then, tuning is performed for DBV4095 APL 70% to get a corresponding anode reset voltage $V_{init2}$ of −3.5V, tuning is performed for DBV4095 APL 50% to get a corresponding anode reset voltage $V_{init2}$ of −3.7V, tuning is performed for DBV4095 APL 25% to get a corresponding anode reset voltage $V_{init2}$ of −3.8V, and tuning is performed for DBV4095 APL 0% to get a corresponding anode reset voltage $V_{init2}$ of −4.0V, as shown in Table 2.

TABLE 2

| Band | Binding Point | | | | |
|---|---|---|---|---|---|
| | APL 0% | APL 25% | APL 50% | APL 70% | APL 100% |
| DBV4095 | −4.0 | −3.8 | −3.7 | −3.5 | −3.3 |
| DBV4000 | | | | | −3.5 |
| DBV2000 | | | | | −3.7 |
| DBV1000 | | | | | −3.8 |
| DBV0 | | | | | −4.2 |

In a same mode, anode reset voltages $V_{init2}$ corresponding to different APL binding points of other Bands may be obtained, as shown in Table 3.

TABLE 3

| Band | Binding point | | | | |
|---|---|---|---|---|---|
| | APL 0% | APL 25% | APL 50% | APL 70% | APL 100% |
| DBV4095 | −4.0 | −3.8 | −3.7 | −3.5 | −3.3 |
| DBV4000 | −4.0 | −3.9 | −3.7 | −3.6 | −3.5 |
| DBV2000 | −4.2 | −4.1 | −4.0 | −3.8 | −3.7 |
| DBV1000 | −4.3 | −4.2 | −4.1 | −3.9 | −3.8 |
| DBV0 | −4.7 | −4.5 | −4.4 | −4.3 | −4.2 |

In some exemplary embodiments, the corresponding anode reset voltage is determined according to the current DBV band and the average picture level, which includes: according to the corresponding relationship table and the current DBV band, interpolation calculation is performed to get anode reset voltages of a first average picture level binding point to an M-th average picture level binding point corresponding to the current DBV band, updating the corresponding relationship table; and according to the updated corresponding relationship table and an average picture level of the pattern to be displayed, interpolation calculation is performed to get an anode reset voltage corresponding to the current DBV band and the average picture level.

In some exemplary implementations, a calculation formula by which interpolation calculation is performed according to the corresponding relationship table and the current DBV band is:

$$\frac{La1 - La2}{La1 - La3} = \frac{V_{init2-La1-APL_b} - V_{init2-La2-APL_b}}{V_{init2-La1-APL_b} - V_{init2-La3-APL_b}},$$

wherein $V_{init2-La1-APL_b}$ is an anode reset voltage corresponding to a DBV band La1, an average picture level$APL_b$, $V_{init2-La2-APL_b}$ is an anode reset voltage corresponding to a DBV band La2, an average picture level $APL_b$, $V_{init2-La3-APL_b}$ is an anode reset voltage corresponding to a DBV band La3, an average picture level $APL_b$, a1, a2, and a3 are all arbitrary values between 1 and N, and b is any value between 1 and M.

Illustratively, assuming that the current DBV band is DBV3000 and the average picture level of the pattern to be displayed is 80%, various APL binding points, APL 0%, APL 25%, APL 50%, APL 70%, APL 100%, under DBV3000 are respectively calculated according to a linear interpolation method as shown in FIG. 12, corresponding anode reset voltages V0, V1, V2, V3, V4 is as shown in Table 4.

TABLE 4

| Band | Binding point | | | | |
|---|---|---|---|---|---|
| | APL 0% | APL 25% | APL 50% | APL 70% | APL 100% |
| DBV4095 | −4.0 | −3.8 | −3.7 | −3.5 | −3.3 |
| DBV4000 | −4.0 | −3.9 | −3.7 | −3.6 | −3.5 |
| DBV3000 (non-binding point) | V0 | V1 | V2 | V3 | V4 |
| DBV2000 | −4.2 | −4.1 | −4.0 | −3.8 | −3.7 |
| DBV1000 | −4.3 | −4.2 | −4.1 | −3.9 | −3.8 |
| DBV0 | −4.7 | −4.5 | −4.4 | −4.3 | −4.2 |

Illustratively, a linear interpolation formula for V4 is (4000−3000)/(4000−2000)=(−3.5−V4)/(−3.5−(−3.7)). After linear interpolation is performed for V0, V1, V2, V3, and V4, respectively, Table 5 is obtained.

TABLE 5

| Band | Binding point | | | | |
|---|---|---|---|---|---|
| | APL 0% | APL 25% | APL 50% | APL 70% | APL 100% |
| DBV4095 | −4.0 | −3.8 | −3.7 | −3.5 | −3.3 |
| DBV4000 | −4.0 | −3.9 | −3.7 | −3.6 | −3.5 |
| DBV3000 (non-binding point) | −4.1 | −4 | −3.85 | −3.7 | −3.6 |
| DBV2000 | −4.2 | −4.1 | −4.0 | −3.8 | −3.7 |
| DBV1000 | −4.3 | −4.2 | −4.1 | −3.9 | −3.8 |
| DBV0 | −4.7 | −4.5 | −4.4 | −4.3 | −4.2 |

In some exemplary embodiments, a calculation formula by which interpolation calculation is performed according to the updated corresponding relationship table and the average picture level of the pattern to be displayed is:

$$\frac{APL_{b1} - APL_{b2}}{APL_{b1} - APL_{b3}} = \frac{V_{init2-La-APL_{b1}} - V_{init2-La-APL_{b2}}}{V_{init2-La-APL_{b1}} - V_{init2-La-APL_{b3}}},$$

wherein $V_{init2-La-APL_{b1}}$ is an anode reset voltage corresponding to the DBV band La, an average picture level $APL_{b1}$, $V_{init2-La-APL_{b2}}$ is an anode reset voltage corresponding to the DBV band La, an average picture level $APL_{b2}$, $V_{init2-La-APL_{b3}}$ is an anode reset voltage corresponding to the DBV band La, an average picture level $APL_{b3}$, b1, b2, and b3 are all arbitrary values between 1 and M, and La is a current DBV band.

Still taking the current DBV band as DBV3000 and the average picture level of the pattern to be displayed as 80% for example, a corresponding anode reset voltage under DBV3000 APL 80% is calculated according to a linear interpolation method shown in FIG. 13, as shown in Table 6.

Illustratively, an anode reset voltage corresponding to APL 80% may be obtained by performing linear interpolation on anode reset voltages corresponding to APL 70% and APL 100%, and results are shown in Table 6.

TABLE 6

| | Binding point | | | | | |
|---|---|---|---|---|---|---|
| Band | APL 0% | APL 25% | APL 50% | APL 70% | APL 80% (non-binding point) | APL 100% |
| DBV4095 | −4.0 | −3.8 | −3.7 | −3.5 | −3.45 | −3.3 |
| DBV4000 | −4.0 | −3.9 | −3.7 | −3.6 | −3.55 | −3.5 |
| DBV3000 (non-binding point) | −4.1 | −4 | −3.85 | −3.7 | −3.65 | −3.6 |
| DBV2000 | −4.2 | −4.1 | −4.0 | −3.8 | −3.75 | −3.7 |
| DBV1000 | −4.3 | −4.2 | −4.1 | −3.9 | −3.85 | −3.8 |
| DBV0 | −4.7 | −4.5 | −4.4 | −4.3 | −4.25 | −4.2 |

To sum up, when the display panel of the embodiment of the present disclosure is actually used for display, the following contents need to be set in advance: 1) DBV Bands and an anode reset voltage corresponding to Band (APL=1), 2) Different APL binding points under various DBV Bands and anode reset voltages corresponding to different APL binding points; 3) R/G/B current proportions, which quantizes an inputted Pattern into APL according to pixel display arrangement information of the inputted Pattern in a low frequency driving mode; and when the Pattern is outputted, a corresponding anode reset voltage is used according to a mapping relationship among DBV Bands, APLs, and anode reset voltages to achieve dynamic adjusting of anode reset voltages of a display module product.

Figure 14:
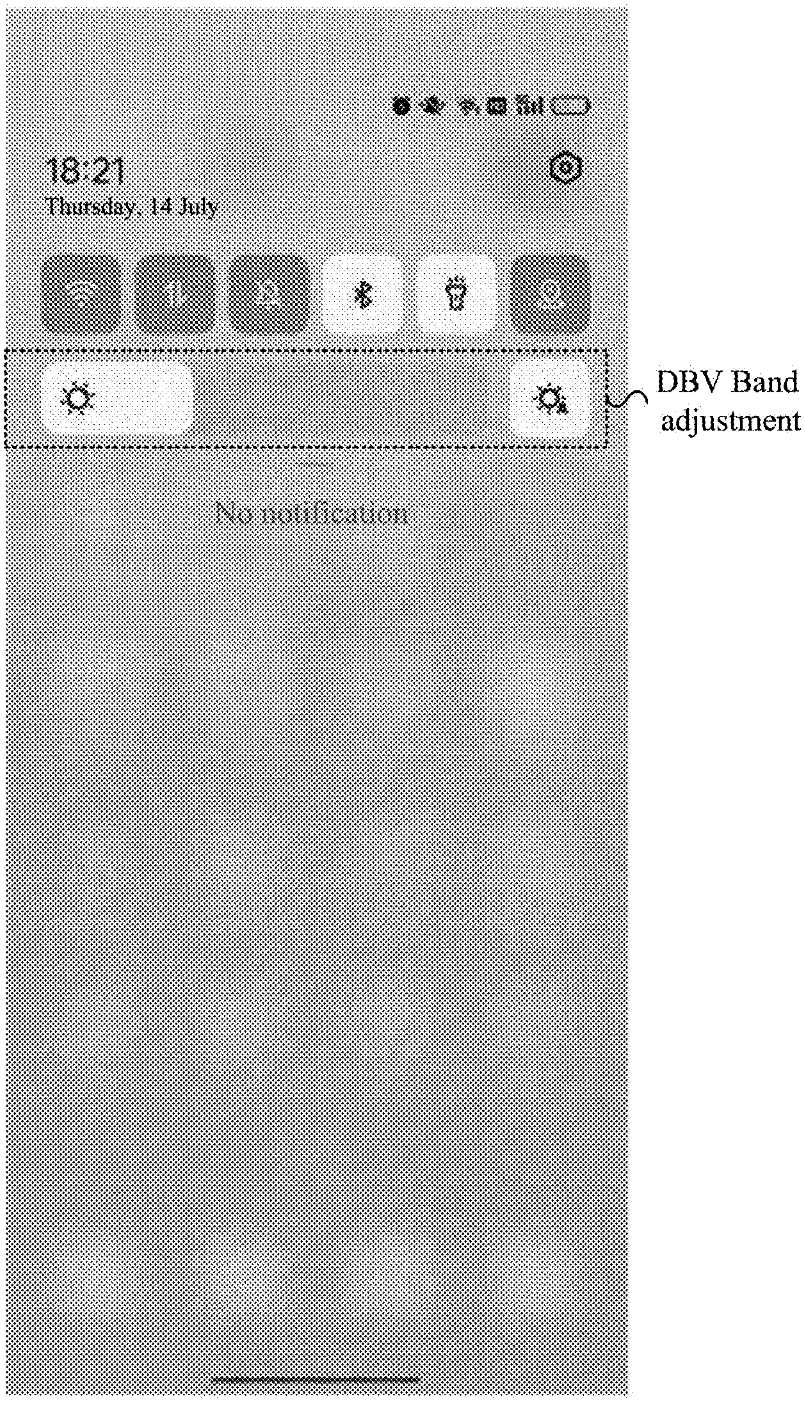
FIG. 14 is a schematic diagram of a method for setting a DBV band according to an exemplary embodiment of the present disclosure.
Figure 15:
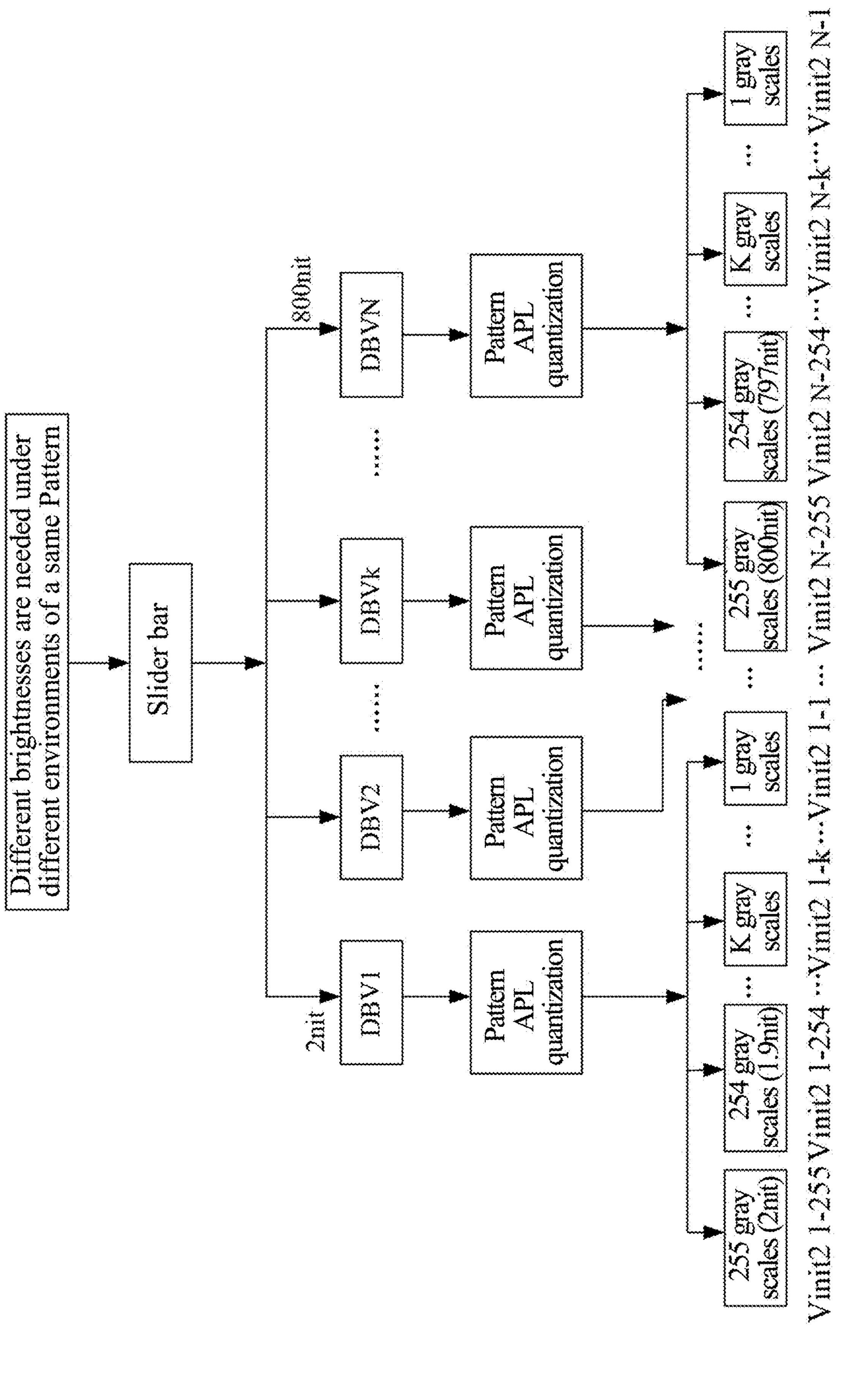
FIG. 15 is a schematic diagram of an embodiment for dynamically adjusting an anode reset voltage of a hold frame of an LTPO display module according to an exemplary embodiment of the present disclosure.

As shown in FIG. 14 and FIG. 15, a user may adjust a current DBV Band according to a requirement (using a slider bar in FIG. 14 for adjusting). When a system terminal transmits the pattern to be displayed to the initial signal generator, the initial signal generator quantizes the pattern to be displayed to get APL, and uses a corresponding anode reset voltage $V_{init2}$ according to DBV Band used in a current usage scene and the APL obtained by quantization processing, achieving the dynamic adjusting.

LTPO technology is one of core technologies of display module design in intelligent era. Adaptively refreshing frequency is one of important functions achieved by an LTPO display module, that is, adaptively switching different refresh frequencies according to a usage scene, and an image quality does not change. In some embodiments, gamma adjustment is performed on refresh frames (and the normal driving mode) of the LTPO display module in the low frequency driving mode, and hold frames use the gamma of refresh frames, and an image quality difference of different frequencies is reduced by adjusting a related voltage of the hold frames. However, due to same setting of anode reset voltages of different gray scales under the same DBV Band, brightness differences of high gray scale and low gray scale display patterns in a frequency switching process are different, and it is difficult to meet the image quality display requirements of LTPO adaptively refreshing frequency by using same voltage setting. Therefore, using different voltage adjustment designs for different gray scales in the same DBV Band is an effective guarantee to improve the image quality of the LTPO display module. An embodiment of the present disclosure provides a method for dynamically adjusting an anode reset voltage $V_{init2}$ of hold frames of the LTPO display module, in which anode reset voltages $V_{init2}$ under different DBV Bands and different APLs are burned to IC, the pattern to be displayed in the hold frame stage is quantized to get APL, and a corresponding anode reset voltage $V_{init2}$ is used according to APL of a pattern to be displayed, which achieves dynamic adjusting on anode reset voltages $V_{init2}$ under different display patterns so as to meet an image quality requirement in a frequency switching process.

An embodiment of the present disclosure also provides a display apparatus, including the display panel of any one of embodiments of the present disclosure.

An embodiment of the present disclosure also provides a method for displaying a display panel, wherein the display panel includes multiple pixel units arranged in an array, at least one pixel unit includes multiple sub-pixels, at least one sub-pixel includes a pixel drive circuit and a light emitting element electrically connected with the pixel drive circuit, the display panel further includes an initial signal generator, a driving mode of the display panel includes a low frequency driving mode and a normal driving mode, the low frequency driving mode including a refresh frame stage configured to write data to the pixel unit and a hold frame stage configured to hold the data written to the pixel unit, and the display method includes: in the low frequency driving mode, acquiring a current DBV band and a pattern to be displayed; quantizing the pattern to be displayed to get an average picture level, wherein the average picture level is positively correlated with a brightness of a pixel unit by which the pattern to be displayed is started and negatively correlated with a brightness of the display panel when displaying an all-white pattern; determining a corresponding anode reset voltage according to the current DBV band and the average picture level; and in the hold frame stage, outputting the corresponding anode reset voltage to the pixel drive circuit to reset an anode of the light emitting element.

An embodiment of the present disclosure also provides an initial signal generator, wherein the initial signal generator may include a processor and a memory storing a computer program capable of be run on the processor, wherein, when executing the computer program, the processor achieves acts of the display method according to any one of the preceding items in the present disclosure.

In an example, the initial signal generator may include: a processor, a memory, and a bus system, wherein the processor and the memory are connected through the bus system, the memory is configured to store instructions, and the processor is configured to execute the instructions stored in the memory to acquire a current DBV band and a pattern to be displayed under a low frequency driving mode; quantize the pattern to be displayed to get an average picture level, wherein the average picture level is positively correlated with a brightness of a pixel unit by which the pattern to be displayed is started and negatively correlated with a brightness of the display panel when displaying an all-white pattern; determine a corresponding anode reset voltage according to the current DBV band and the average picture level; and in a hold frame stage, output a corresponding anode reset voltage to the pixel drive circuit to reset an anode of the light emitting element.

It should be understood that the processor may be a Central Processing Unit (CPU), or the processor may be another general-purpose processor, a Digital Signal Processor (DSP), an Application Specific Integrated Circuit (ASIC), a Field Programmable Gate Array (FPGA), or another programmable logic device, a discrete gate, or a transistor logic device, a discrete hardware component, or the like. The general-purpose processor may be a microprocessor, or the processor may be any conventional processor, etc.

The memory may include a read-only memory and a random access memory, and provide instructions and data to the processor. A part of the memory may further include a non-volatile random access memory. For example, the memory may further store information of a device type.

Besides a data bus, the bus system may also include a power supply bus, a control bus, and a state signal bus, etc.

In an implementation process, processing performed by the processing equipment may be completed by an integrated logic circuit of hardware in the processor or instructions in a form of software. That is, acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory or an electrically erasable programmable memory, or a register, etc. The storage medium is located in the memory, and the processor reads information in the memory and completes the acts of the above method in combination with hardware thereof. In order to avoid repetition, detailed description is not provided here.

An embodiment of the present disclosure also provides a computer-readable storage medium, wherein the computer-readable storage medium stores executable instructions, and when the executable instructions are executed by a processor, the display method provided by any of the above embodiments of the present disclosure may be achieved. The display method may acquire a current DBV band and a pattern to be displayed under a low frequency driving mode; quantize the pattern to be displayed to get an average picture level, wherein the average picture level is positively correlated with a brightness of a pixel unit by which the pattern to be displayed is started and negatively correlated with a brightness of the display panel when displaying an all-white pattern; determine a corresponding anode reset voltage according to the current DBV band and the average picture level; and in a hold frame stage, output a corresponding anode reset voltage to the pixel drive circuit to reset an anode of the light emitting element. Therefore, different anode reset voltages are used in different gray scales of hold frames to balance voltage fluctuation of a fourth node N4 in high gray scale and low gray scale, and brightness differences between refresh frames and hold frames of high and low gray scales are effectively reduced. A method for driving display by executing executable instructions is basically the same as the display method provided in the above embodiments of the present disclosure, and will not be repeated here.

In some possible implementations, various aspects of the display method provided in the present application may also be implemented in a form of a program product, which includes program codes. When the program product is run on a computer device, the program codes are used for enabling the computer device to perform acts in the display method according to various exemplary implementations of the present application described above in this specification, for example, the computer device may perform the display method recorded in the embodiments of the present application.

For the program product, any combination of one or more readable media may be used. The readable medium may be a readable signal medium or a readable storage medium. The readable storage medium may be, for example, but is not limited to, an electrical, magnetic, optical, electromagnetic, infrared, or semiconductor system, apparatus, or device, or a combination of any of the above. More specific examples (non-exhaustive list) of the readable storage medium include: an electrical connection with one or more wires, a portable disk, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above.

Those of ordinary skills in the art may understand that all or some of acts in the methods disclosed above, systems, functional modules or units in apparatuses may be implemented as software, firmware, hardware, and an appropriate combination thereof. In a hardware implementation, division of the function modules/units mentioned in the above description is not always corresponding to division of physical components. For example, a physical component may have multiple functions, or a function or an act may be executed by several physical components in cooperation. Some components or all components may be implemented as software executed by a processor such as a digital signal processor or a microprocessor, or implemented as hardware, or implemented as an integrated circuit such as a specific integrated circuit. Such software may be distributed on a computer-readable medium, and the computer-readable medium may include a computer storage medium (or a non-transitory medium) and a communication medium (or a transitory medium). As known to those of ordinary skills in the art, a term computer storage medium includes volatile or nonvolatile, and removable or irremovable media implemented in any method or technology for storing information (for example, a computer-readable instruction, a data structure, a program module, or other data). The computer storage medium includes, but is not limited to, an RAM, an ROM, an EEPROM, a flash memory or another memory technology, a CD-ROM, a Digital Versatile Disk (DVD) or another optical disk storage, a magnetic cartridge, a magnetic tape, magnetic disk storage or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

Although the implementations disclosed in the present disclosure are described as above, the described contents are only implementations which are used for facilitating understanding of the present disclosure, but are not intended to limit the present invention. Any skilled person in the art to which the present disclosure pertains may make any modifications and variations in forms and details of implementations without departing from the spirit and scope of the present disclosure. However, the patent protection scope of the present invention should still be subject to the scope defined by the appended claims.

The invention claimed is:

1. A display panel, comprising a plurality of pixel units arranged in an array, at least one pixel unit comprising a plurality of sub-pixels, at least one sub-pixel comprising a pixel drive circuit and a light emitting element electrically connected with the pixel drive circuit, the display panel further comprising an initial signal generator, a driving mode of the display panel comprising a low frequency driving mode and a normal driving mode, and the low frequency driving mode comprising a refresh frame stage configured to write data to the pixel unit and a hold frame stage configured to hold the data written to the pixel unit, wherein:

the initial signal generator comprises a processor and a memory, wherein the processor and the memory are connected, the memory is configured to store instructions and the processor is configured to execute the instructions stored in the memory, and the initial signal generator is configured to acquire a current display brightness value (DBV) band and a pattern to be displayed under the low frequency driving mode; quantize the pattern to be displayed to get an average picture level, wherein the average picture level is positively correlated with a brightness of a pixel unit by which the pattern to be displayed is started and negatively correlated with a brightness of the display panel when displaying an all-white pattern; determine a corresponding anode reset voltage according to the current DBV band and the average picture level; and in the hold frame stage, output the corresponding anode reset voltage to the pixel drive circuit to reset an anode of the light emitting element.

2. The display panel of claim 1, wherein the average picture level is a sum of sub-average picture levels of the plurality of sub-pixels, and a sub-average picture level of each sub-pixel is equal to a product of an average gray scale and a current proportion of each sub-pixel.

3. The display panel of claim 2, wherein an average gray scale $K_x$ of a sub-pixel $P_x$ is calculated by a following formula:

$$K_x = \frac{\Sigma_{j=1}^{n}\Sigma_{i=1}^{m}\left(G_{ij_x}/G_{max}\right)^r}{m \times n},$$

wherein m is a quantity of vertical pixel units, n is a quantity of horizontal pixel units, $G_{ij_x}$ is a gray scale displayed for the sub-pixel $P_x$ in a pixel unit of an i-th row and a j-th column when the pattern to be displayed is displayed, $G_{max}$ is a maximum gray scale value displayed for each sub-pixel, and r is a gamma value; and a current proportion $R_x$ of the sub-pixel $P_x$ is calculated by a following formula:

$$R_x = \frac{I_{EL\_x}}{\Sigma_{a=1}^{A} I_{EL\_a}},$$

wherein x is a natural number between 1 and A, A is a quantity of sub-pixels included in the pixel unit, $I_{EL\_x}$ is a current consumed by the sub-pixel $P_x$ when a white pattern is displayed for full screen.

4. The display panel of claim 1, wherein the pixel unit comprises a red sub-pixel, a blue sub-pixel, and a green sub-pixel.

5. The display panel of claim 4, wherein the average picture level is calculated by following formulas:

$$APL_{red} = \frac{\Sigma_{j=1}^{n}\Sigma_{i=1}^{m}\left(G_{ij_{red}}/255\right)^{2.2}}{m \times n} \times R_{red};$$

$$APL_{green} = \frac{\Sigma_{j=1}^{n}\Sigma_{i=1}^{m}\left(G_{ij_{green}}/255\right)^{2.2}}{m \times n} \times R_{green};$$

$$APL_{blue} = \frac{\Sigma_{j=1}^{n}\Sigma_{i=1}^{m}\left(G_{ij_{blue}}/255\right)^{2.2}}{m \times n} \times R_{blue};$$

$$APL = APL_{red} + APL_{green} + APL_{blue};$$

wherein APL is the average picture level, $APL_{red}$, $APL_{green}$, and $APL_{blue}$ are sub-average picture levels of the red sub-pixels, the green sub-pixels, and the blue sub-pixels respectively, m is a quantity of vertical pixel units, n is a quantity of horizontal pixel units, $G_{ij_{red}}$, $G_{ij_{green}}$, and $G_{ij_{blue}}$ are respectively gray scales displayed for the red sub-pixel, the green sub-pixel, and the blue sub-pixel in a pixel unit of an i-th row and a j-th column when the pattern to be displayed is displayed, gray scales displayed by various sub-pixels are between 0 and 255, $R_{red}$, $R_{green}$, and $R_{blue}$ are respectively current proportions of the red sub-pixels, the green sub-pixels, and the blue sub-pixels when a white pattern is displayed for full screen, and $R_{red}+R_{green}+R_{blue}=1$.

6. The display panel of claim 1, wherein the initial signal generator is further configured to:

store in advance a corresponding relationship table of the DBV band, an average picture level binding point, and the anode reset voltage, wherein the display brightness band comprises a first brightness band to an N-th brightness band, maximum gray scale brightnesses from the first brightness band to the N-th brightness band increase in turn, each display brightness band comprises a first average picture level binding point to an M-th average picture level binding point, and average picture levels from the first average picture level binding point to the M-th average picture level binding point increase in turn.

7. The display panel of claim 6, wherein an average picture level of the first average picture level binding point is 0%, and an average picture level of the M-th average picture level binding point is 100%.

8. The display panel of claim 6, wherein a quantity of the DBV bands stored in advance is ≥10.

9. The display panel of claim 6, wherein M≥5.

10. The display panel of claim 6, wherein determining a corresponding anode reset voltage according to the current DBV band and the average picture level comprises:

according to the corresponding relationship table and the current DBV band, performing interpolation calculation to get anode reset voltages of the first average picture level binding point to the M-th average picture level binding point corresponding to the current DBV band, updating the corresponding relationship table; and according to the updated corresponding relationship table and an average picture level of the pattern to be displayed, performing interpolation calculation to get an anode reset voltage corresponding to the current DBV band and the average picture level.

11. The display panel of claim 10, wherein a calculation formula by which interpolation calculation is performed according to the corresponding relationship table and the current DBV band is:

$$\frac{La1 - La2}{La1 - La3} = \frac{V_{init2-La1-APL_b} - V_{init2-La2-APL_b}}{V_{init2-La1-APL_b} - V_{init2-La3-APL_b}},$$

wherein $V_{init2-La1-APL_b}$ is an anode reset voltage corresponding to a DBV band La1, an average picture level $APL_b$, $V_{init2-La2-APL_b}$ is an anode reset voltage corresponding to a DBV band La2, an average picture level $APL_b$, $V_{init2-La3-APL_b}$ is an anode reset voltage corresponding to a DBV band La3, an average picture level $APL_b$, a1, a2, and a3 are all arbitrary values between 1 and N, and b is any value between 1 and M.

12. The display panel of claim 10, wherein a calculation formula by which interpolation calculation is performed according to the updated corresponding relationship table and the average picture level of the pattern to be displayed is:

$$\frac{APL_{b1} - APL_{b2}}{APL_{b1} - APL_{b3}} = \frac{V_{init2-La-APL_{b1}} - V_{init2-La-APL_{b2}}}{V_{init2-La-APL_{b1}} - V_{init2-La-APL_{b3}}},$$

wherein $V_{init2-La-APL_{b1}}$ is an anode reset voltage corresponding to a DBV band La, an average picture level $APL_{b1}$, $V_{init2-La-APL_{b2}}$ is an anode reset voltage corresponding to the DBV band La, an average picture level $APL_{b2}$, $V_{init2-La-APL_{b3}}$ is an anode reset voltage corresponding to the DBV band La, an average picture level $APL_{b3}$, b1, b2, and b3 are all arbitrary values between 1 and M, and La is the current DBV band.

13. The display panel of claim 1, wherein the pixel drive circuit comprises a first transistor, a second transistor, a third transistor, a fourth transistor, a fifth transistor, a sixth transistor, a seventh transistor, and a storage capacitor, wherein:

a gate electrode of the first transistor is connected with a first reset signal line, a first electrode of the first transistor is connected with a first initial signal line, and a second electrode of the first transistor is connected with a first node;

a gate electrode of the second transistor is connected with a second scan signal line, a first electrode of the second transistor is connected with the first node, and a second electrode of the second transistor is connected with a third node;

a gate electrode of the third transistor is connected with the first node, a first electrode of the third transistor is connected with a second node, and a second electrode of the third transistor is connected with the third node;

a gate electrode of the fourth transistor is connected with a first scan signal line, a first electrode of the fourth transistor is connected with a data signal line, and a second electrode of the fourth transistor is connected with the second node;

a gate electrode of the fifth transistor is connected with a light emitting signal line, a first electrode of the fifth transistor is connected with a first power supply line, and a second electrode of the fifth transistor is connected with the second node;

a gate electrode of the sixth transistor is connected with the light emitting signal line, a first electrode of the sixth transistor is connected with the third node, a second electrode of the sixth transistor is connected with an anode of the light emitting element, and a cathode of the light emitting element is connected with a second power supply line;

a gate electrode of the seventh transistor is connected with the first scan signal line, a first electrode of the seventh transistor is connected with a second initial signal line, and a second electrode of the seventh transistor is connected with a fourth node;

a first terminal of the storage capacitor is connected with the first power supply line, and a second terminal of the storage capacitor is connected with the first node.

14. The display panel of claim 13, wherein the first transistor and the second transistor are oxide transistors, and the third transistor and the seventh transistor are poly silicon transistors.

15. A display apparatus, comprising the display panel of claim 1.

16. A method for displaying a display panel, wherein the display panel comprises a plurality of pixel units arranged in an array, at least one pixel unit comprises a plurality of sub-pixels, at least one sub-pixel comprises a pixel drive circuit and a light emitting element electrically connected with the pixel drive circuit, the display panel further comprises an initial signal generator, a driving mode of the display panel comprises a low frequency driving mode and a normal driving mode, the low frequency driving mode comprising a refresh frame stage configured to write data to the pixel unit and a hold frame stage configured to hold the data written to the pixel unit, and the display method comprises:

in the low frequency driving mode, acquiring, by the initial signal generator, a current display brightness value (DBV) band and a pattern to be displayed;

quantizing, by the initial signal generator, the pattern to be displayed to get an average picture level, wherein the average picture level is positively correlated with a brightness of a pixel unit by which the pattern to be displayed is started and negatively correlated with a brightness of the display panel when displaying an all-white pattern;

determining, by the initial signal generator, a corresponding anode reset voltage according to the current DBV band and the average picture level; and in the hold frame stage, outputting, by the initial signal generator, the corresponding anode reset voltage to the pixel drive circuit to reset an anode of the light emitting element.

17. A non-transitory computer-readable storage medium, having one or more programs stored therein, wherein the one or more programs are executable by one or more processors to implement acts of the display method of claim 16.

18. An initial signal generator, comprising a memory and a processor coupled to the memory, wherein the processor is configured to execute acts of a display method described as follows based on instructions stored in the memory:

in a low frequency driving mode of a display panel, acquiring a current display brightness value (DBV) band and a pattern to be displayed;

quantizing the pattern to be displayed to get an average picture level, wherein the average picture level is positively correlated with a brightness of a pixel unit by which the pattern to be displayed is started and negatively correlated with a brightness of the display panel when displaying an all-white pattern;

determining a corresponding anode reset voltage according to the current DBV band and the average picture level; and in a hold frame stage, outputting the corresponding anode reset voltage to a pixel drive circuit to reset an anode of a light emitting element.

* * * * *